US012752773B2

(12) United States Patent
Min et al.

(10) Patent No.: US 12,752,773 B2
(45) Date of Patent: Oct. 6, 2026

(54) VEHICLE FOR AVOIDING COLLISION AND METHOD FOR OPERATING THE SAME

(71) Applicants: Hyundai Motor Company, Seoul (KR); Kia Corporation, Seoul (KR); Ajou University Industry-Academic Cooperation Foundation, Suwon-si (KR)

(72) Inventors: Young Bin Min, Busan (KR); Jong Sung Park, Hwaseong-si (KR); Bong Sob Song, Suwon-si (KR); Ji Min Lee, Hwaseong-si (KR); Sung Woo Lee, Suwon-si (KR)

(73) Assignees: HYUNDAI MOTOR COMPANY, Seoul (KR); KIA MOTORS CORPORATION, Seoul (KR); AJOU UNIVERSITY INDUSTRY-ACADEMIC COOPERATION FOUNDATION, Suwon-si (KR)

( * ) Notice: Subject to any disclaimer, the term of this patent is extended or adjusted under 35 U.S.C. 154(b) by 92 days.

(21) Appl. No.: 18/418,705

(22) Filed: Jan. 22, 2024

(65) Prior Publication Data

US 2024/0270238 A1 Aug. 15, 2024

(30) Foreign Application Priority Data

Feb. 10, 2023 (KR) ........................ 10-2023-0017969

(51) Int. Cl.
*B60W 30/09* (2012.01)
*B60W 30/095* (2012.01)
(Continued)

(52) U.S. Cl.
CPC ........ *B60W 30/09* (2013.01); *B60W 30/0956* (2013.01); *B60W 30/16* (2013.01);
(Continued)

(58) Field of Classification Search
CPC ..... B60W 2050/143; B60W 2050/146; B60W 2420/403; B60W 2552/15;
(Continued)

(56) References Cited

U.S. PATENT DOCUMENTS 8,606,479 B2 * 12/2013 Sekiguchi .............. G08G 1/166 701/96
9,235,767 B2 * 1/2016 Fukata ................... G08G 1/167
(Continued)

FOREIGN PATENT DOCUMENTS

CN 114228706 A * 3/2022 .......... B60W 30/095

*Primary Examiner* — Babar Sarwar
(74) *Attorney, Agent, or Firm* — Slater Matsil, LLP

(57) ABSTRACT

In an embodiment, a vehicle includes a plurality of sensors for obtaining surrounding environment information including a nearby object information or a road information. A processor is in operative connection with the plurality of sensors. The processor is configured to predict a position change of a nearby object based on the surrounding environment information, and determine one among a plurality of avoidance behavior types for avoiding collision in a lane as an avoidance behavior type of the vehicle based on the predicted position change of the nearby object, wherein the plurality of avoidance behavior types comprises an evasive steering to right (ESR) type, an evasive steering to left (ESL) type, or a decelerating (DEC) type.

20 Claims, 13 Drawing Sheets

(51) Int. Cl.

| | |
|---|---|
| ***B60W 30/16*** | (2020.01) |
| ***B60W 40/06*** | (2012.01) |
| ***B60W 50/00*** | (2006.01) |
| ***B60W 50/14*** | (2020.01) |
| ***G06V 20/58*** | (2022.01) |

(52) U.S. Cl.

CPC ........ *B60W 40/06* (2013.01); *B60W 50/0097* (2013.01); *B60W 50/14* (2013.01); *G06V 20/58* (2022.01); *B60W 2050/146* (2013.01); *B60W 2420/403* (2013.01); *B60W 2552/15* (2020.02); *B60W 2552/30* (2020.02); *B60W 2554/4041* (2020.02); *B60W 2554/4045* (2020.02); *B60W 2554/4046* (2020.02); *B60W 2554/801* (2020.02)

(58) Field of Classification Search

CPC ..... B60W 2552/30; B60W 2554/4041; B60W 2554/4045; B60W 2554/4046; B60W 2554/801; B60W 30/08; B60W 30/09; B60W 30/095; B60W 30/0953; B60W 30/0956; B60W 30/16; B60W 40/06; B60W 50/0097; B60W 50/14; B60W 60/0011; B60W 60/0027; G06V 20/58

See application file for complete search history.

(56) References Cited

U.S. PATENT DOCUMENTS

| | | | | |
|---|---|---|---|---|
| 10,916,144 | B2 * | 2/2021 | Kang | G08G 1/167 |
| 11,535,252 | B2 * | 12/2022 | Park | B60W 30/0956 |
| 11,787,401 | B2 * | 10/2023 | Nishimura | B60W 30/0953 701/45 |
| 11,970,164 | B1 * | 4/2024 | Havlak | B60W 30/0956 |
| 11,999,345 | B2 * | 6/2024 | Shah | G01C 21/3407 |
| 12,304,476 | B2 * | 5/2025 | Kassar | B60W 30/0956 |
| 2008/0167781 | A1 * | 7/2008 | Labuhn | B60W 30/08 701/70 |
| 2010/0123778 | A1 * | 5/2010 | Hada | B60K 35/22 348/148 |
| 2014/0152488 | A1 * | 6/2014 | Baba | G01S 13/867 342/70 |
| 2014/0297171 | A1 * | 10/2014 | Minemura | B60R 21/34 342/70 |
| 2015/0025784 | A1 * | 1/2015 | Kastner | G08G 1/166 701/119 |
| 2015/0213718 | A1 * | 7/2015 | Ono | B60Q 9/008 340/435 |
| 2015/0379334 | A1 * | 12/2015 | Iwasaki | G06V 40/10 382/104 |
| 2016/0335892 | A1 * | 11/2016 | Okada | B60T 7/042 |
| 2016/0339910 | A1 * | 11/2016 | Jonasson | B60W 10/18 |
| 2017/0031363 | A1 * | 2/2017 | Laur | G01S 13/931 |
| 2017/0199274 | A1 * | 7/2017 | Sasabuchi | G01S 13/867 |
| 2017/0248949 | A1 * | 8/2017 | Moran | B60W 30/085 |
| 2017/0270799 | A1 * | 9/2017 | Takeda | B62D 15/02 |
| 2017/0282915 | A1 * | 10/2017 | Kim | B60W 30/08 |
| 2018/0149743 | A1 * | 5/2018 | Bialer | B62D 15/0265 |
| 2018/0154889 | A1 * | 6/2018 | Minemura | B60W 30/09 |
| 2018/0174462 | A1 * | 6/2018 | Um | B60W 30/09 |
| 2018/0178789 | A1 * | 6/2018 | Nishimura | G08G 1/167 |
| 2018/0233048 | A1 * | 8/2018 | Andersson | B60Q 9/008 |
| 2018/0297591 | A1 * | 10/2018 | Minemura | B60W 30/0956 |
| 2018/0362033 | A1 * | 12/2018 | Newman | B60Q 9/008 |
| 2018/0366001 | A1 * | 12/2018 | Matsunaga | B60W 50/14 |
| 2018/0370529 | A1 * | 12/2018 | Matsunaga | B60W 30/09 |
| 2019/0100197 | A1 * | 4/2019 | Saiki | B60Q 9/008 |
| 2019/0122555 | A1 * | 4/2019 | Takaki | G01S 13/931 |
| 2019/0137622 | A1 * | 5/2019 | Lopez-Hinojosa | G01S 13/867 |
| 2021/0053570 | A1 * | 2/2021 | Akella | B60W 30/18163 |
| 2021/0078168 | A1 * | 3/2021 | Mehnert | G05D 1/021 |
| 2021/0155266 | A1 * | 5/2021 | Sun | B60W 60/0027 |
| 2022/0105940 | A1 * | 4/2022 | Hartnett | B60W 60/0011 |
| 2022/0105959 | A1 * | 4/2022 | Hartnett | B60W 50/0097 |
| 2022/0114815 | A1 * | 4/2022 | Ko | G06V 10/25 |
| 2022/0185266 | A1 * | 6/2022 | Shah | B60W 30/0956 |
| 2022/0262122 | A1 * | 8/2022 | Taki | G06T 7/20 |
| 2022/0283311 | A1 * | 9/2022 | Zhou | G01S 17/931 |
| 2023/0278548 | A1 * | 9/2023 | Umeda | B60W 30/0953 701/119 |

* cited by examiner

VEHICLE FOR AVOIDING COLLISION AND METHOD FOR OPERATING THE SAME

CROSS-REFERENCE TO RELATED APPLICATIONS

This application claims the benefit of Korean Patent Application No. 10-2023-0017969, filed on Feb. 10, 2023, which application is hereby incorporated herein by reference.

TECHNICAL FIELD

Various embodiments of the present disclosure relate to a vehicle that performs collision avoidance.

BACKGROUND

An autonomous driving system or driver assistance system refers to a system in which a vehicle drives itself without intervention by a driver or a system that intervenes in driving of a driver to assist the driving. Such an autonomous driving system or driver assistance system detects an environment surrounding a vehicle, and controls the vehicle behavior. For example, the autonomous driving system or driver assistance system detects a forward object using a sensor device mounted in a vehicle, and judges whether a situation calls for control of the vehicle behavior for the purpose of collision avoidance by predicting a possibility of collision with a detected object.

On the other hand, various systems that allow avoidance of collision with an object present in front are provided. Such systems typically include an autonomous emergency brake (AEB), a forward vehicle collision mitigation system (FVCMS), a pedestrian detection and collision mitigation system (PDCMS), collision evasive lateral maneuver systems (CELM), and the like.

SUMMARY

Various embodiments of the present disclosure relate to a vehicle that performs steering in a lane for collision avoidance and a method for operating the vehicle.

As described above, most of the systems for collision avoidance predict a behavior of a nearby object, and based on this, control a behavior of a vehicle to avoid collision with the nearby object. However, when collision avoidance is simply performed based on the behavior of the nearby object, it may be difficult to flexibly cope with collision situations according to various surrounding environments.

Accordingly, various embodiments of the present disclosure disclose a vehicle and an operating method thereof that perform collision avoidance in consideration of road information and behavior information of nearby objects.

Various embodiments of the present disclosure disclose a vehicle that determines an avoidance behavior type of an own vehicle for collision avoidance with nearby vehicles and an operating method thereof, based on a predicted trajectory of a behavior of nearby vehicles and an avoidance trajectory of the own vehicle for each avoidance behavior type for avoiding collision in a lane.

Technical advantages to be achieved by an embodiment of the present disclosure are not necessarily limited to the aforementioned embodiments, and those skilled in the art to which the present disclosure pertains may evidently understand other technical advantages and embodiments from the following description.

According to various embodiments of the present disclosure, one embodiment is a vehicle for avoiding collision, including a plurality of sensors for obtaining surrounding environment information including nearby object information and/or road information. The vehicle of an embodiment may further include a processor in operative connection with the plurality of sensors. The processor may predict a position change of a nearby object based on the surrounding environment information, and determine one among a plurality of avoidance behavior types for avoiding collision in a lane as an avoidance behavior type of the vehicle based on the predicted position change of the nearby object. The plurality of avoidance behavior types may include an evasive steering to right (ESR) type, an evasive steering to left (ESL) type, a decelerating (DEC) type, or any combination thereof.

According to an embodiment, the processor may generate a first predicted trajectory for a behavior of the nearby object based on the predicted position change of the nearby object. In an embodiment, a processor may predict whether collision avoidance is possible for each of the plurality of avoidance behavior types using the first predicted trajectory for the behavior of the nearby object and an avoidance trajectory for each of the plurality of avoidance behavior types. In an embodiment, a processor may determine a first avoidance behavior type predicted to be capable of collision avoidance among the plurality of avoidance behavior types as the avoidance behavior type of the vehicle.

According to an embodiment, a processor may generate a final avoidance trajectory by changing an avoidance trajectory corresponding to an avoidance behavior type of the vehicle based on the surrounding environment information.

According to the embodiment, a processor may determine a maximum allowable distance for a lateral behavior of the vehicle, based on position information of the nearby object included in the nearby object information. In an embodiment, a processor may generate the final avoidance trajectory by changing an avoidance trajectory corresponding to the avoidance behavior type of the vehicle based on the maximum allowable distance for the lateral behavior.

According to an embodiment, when there is another object in an avoidance direction corresponding to the avoidance behavior type of the vehicle, the processor may limit the maximum allowable distance for the lateral behavior based on a position of the another object.

According to the embodiment, a processor may generate the final avoidance trajectory by further considering the road information, and the road information may include a curvature, a curvature change rate, a slope, or any combination thereof, of a road on which the vehicle is traveling.

According to an embodiment, a processor may generate an image comprising a first predicted trajectory for the behavior of the nearby object based on the predicted position change of the nearby object. In an embodiment, a processor may generate images for each of the plurality of avoidance behavior types based on the generated image, and each of the images for each of the plurality of avoidance behavior types may include a second predicted trajectory representing a relative behavior of the nearby object to the vehicle. The second predicted trajectory may be determined based on the first predicted trajectory and an avoidance trajectory of the vehicle according to a corresponding avoidance behavior type.

According to an embodiment, based on the second predicted trajectory comprised in the images for each of the plurality of avoidance behavior types, the processor may predict whether collision avoidance is possible for each of the plurality of avoidance behavior types, and determine a first avoidance behavior type predicted to be capable of the collision avoidance among the plurality of avoidance behavior types as the avoidance behavior type of the vehicle.

According to an embodiment, a processor may calculate a degree of a risk of collision between the vehicle and the nearby object based on the nearby object information. In an embodiment, a processor may determine display brightness of the nearby object based on the calculated degree of a risk of collision, and control the nearby object to be displayed according to the display brightness, when generating an image including the first predicted trajectory and images for each of the plurality of avoidance behavior types.

According to an embodiment, a processor may calculate the degree of a risk of collision based on a time to collision between the vehicle and the nearby object, and calculate a warning index for the nearby object. The warning index may be calculated based on a distance between the vehicle and the nearby object, a distance over which the vehicle travels before stopping when the vehicle moves with a uniform acceleration at a maximum deceleration, a stopping distance considering a reaction time until a driver applies a brake, or any combination thereof.

According to various embodiments of the present disclosure, another embodiment is a method for avoiding collision of a vehicle, including obtaining surrounding environment information comprising at least one among nearby object information and road information. In an embodiment a method for avoiding collision of a vehicle may include predicting a position change of a nearby object based on the surrounding environment information, and determining one among a plurality of avoidance behavior types for collision avoidance in a lane as an avoidance behavior type of the vehicle, based on the predicted position change of the nearby object, the plurality of avoidance behavior types may include an evasive steering to right (ESR) type, an evasive steering to left (ESL) type, a decelerating (DEC) type, or any combination thereof.

According to an embodiment, the determining one among a plurality of avoidance behavior types for collision avoidance in a lane may include generating a first predicted trajectory for an avoidance behavior of the nearby object based on the predicted position change of the nearby object, and predicting whether collision avoidance is possible for each of the plurality of avoidance behavior types using the first predicted trajectory for the behavior of the nearby object and an avoidance trajectory for each of the plurality of avoidance behavior types. And, the determining one among a plurality of avoidance behavior types for collision avoidance in a lane may include determining a first avoidance behavior type predicted to be possible for collision avoidance among the plurality of avoidance behavior types as an avoidance behavior type of the vehicle.

According to an embodiment, the method for avoiding collision of a vehicle may further include generating a final avoidance trajectory by changing an avoidance trajectory corresponding to the avoidance behavior type of the vehicle based on the surrounding environment information.

According to an embodiment, the generating a final avoidance trajectory may include determining a maximum allowable distance for a lateral behavior of the vehicle based on the position information of the nearby object included in the nearby object information, and generating the final avoidance trajectory by changing the avoidance trajectory corresponding to the avoidance behavior type of the vehicle based on the maximum allowable distance for the lateral behavior.

According to an embodiment, when another object exists in an avoidance direction corresponding to the avoidance behavior type of the vehicle, the maximum allowable distance for the lateral behavior may be limited based on a position of the other object.

According to an embodiment, the final avoidance trajectory may be formed by further considering the road information, and the road information may include a curvature, a curvature change rate, a slope, or any combination thereof, of a road on which the vehicle is traveling.

According to an embodiment, the determining one among a plurality of avoidance behavior types for collision avoidance in a lane may include generating an image comprising a first predicted trajectory for the behavior of the nearby object based on the predicted position change of the nearby object, and generating images for each of the plurality of avoidance behavior types based on the generated image. Each of the images for each of the plurality of avoidance behavior types may include a second predicted trajectory representing a relative behavior of the nearby object to the vehicle. The second predicted trajectory may be determined based on the first predicted trajectory and an avoidance trajectory of the vehicle according to a corresponding avoidance behavior type.

According to an embodiment, the method for avoiding collision may further include, based on the second predicted trajectory comprised in the images for each of the plurality of avoidance behavior types, predicting whether collision avoidance is possible for each of the plurality of avoidance behavior types, and determining a first avoidance behavior type predicted to be capable of the collision avoidance among the plurality of avoidance behavior types as the avoidance behavior type of the vehicle.

According to an embodiment, the method for avoiding collision may further include calculating a degree of a risk of collision between the vehicle and the nearby object based on the nearby object information, determining display brightness of the nearby object based on the calculated degree of a risk of collision, and controlling the nearby object to be displayed according to the display brightness, when generating an image comprising the first predicted trajectory and images for each of the plurality of avoidance behavior types.

According to an embodiment, the method for avoiding collision may further include calculating the degree of a risk of collision based on a time to collision between the vehicle and the nearby object, and calculating a warning index for the nearby object. The warning index may be calculated based on a distance between the vehicle and the nearby object, a distance over which the vehicle travels before stopping when the vehicle moves with a uniform acceleration at a maximum deceleration, a stopping distance considering a reaction time until a driver applies a brake, or any combination thereof.

According to various embodiment of the present disclosure, the vehicle may flexibly cope with collision situations according to various surrounding environments by performing collision avoidance in consideration of behavior information of nearby objects and road information (e.g., lane, curvature of the road, existence of a shoulder, and the like). In particular, in an embodiment, the vehicle may minimize the risk of collision with nearby objects by determining an avoidance behavior type of the own vehicle based on a predicted trajectory of a behavior of nearby objects and a behavior trajectory of the own vehicle for each avoidance behavior type for avoiding collision in a lane.

DETAILED DESCRIPTION OF ILLUSTRATIVE EMBODIMENTS

Figure 1:
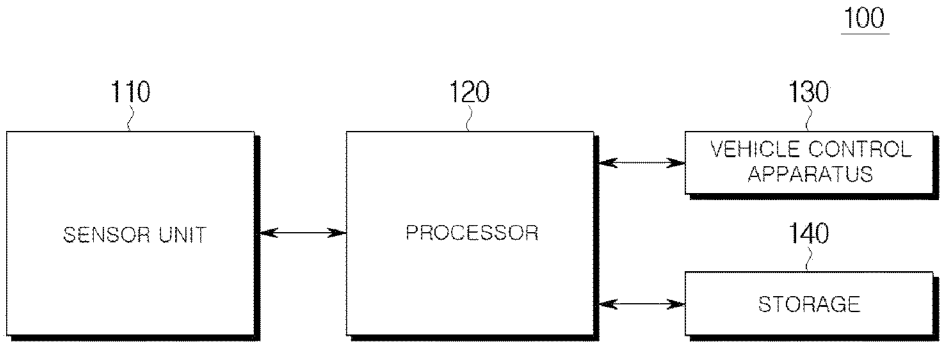
FIG. 1 is a block diagram of a vehicle according to various embodiments of the present disclosure.

Hereinafter, embodiments are described in more detail with reference to accompanying drawings and regardless of the drawing symbols, same or similar components are assigned with the same reference numerals and thus descriptions repetitive for those may be omitted.

As used herein, the suffixes 'module' and 'part' are often used for elements in consideration of convenience in writing out the disclosure and may be used together or interchangeably, and the terms do not have any distinguishable meaning or role by themselves. In addition, a term "part" or "module" used in the embodiments may mean software components and/or hardware components such as a field programmable gate array (FPGA) and an application specific integrated circuit (ASIC). The "part" or "module" performs certain functions. However, the "part" or "module" is not meant to be limited to software or hardware. The "part" or "module" may be configured to be placed in an addressable storage medium or to restore one or more processors. Thus, for one example, the "part" or "module" may include components such as software components, object-oriented software components, class components, and task components, and may include processes, functions, attributes, procedures, subroutines, segments of a program code, drivers, firmware, microcode, circuits, data, databases, data structures, tables, arrays, and variables. Components and functions provided in the "part" or "module" may be combined with a smaller number of components and "parts" or "modules" or may be further divided into additional components and "parts" or "modules".

Methods or algorithm steps described relative to some embodiments may be directly implemented by hardware and software modules that are executed by a processor or may be directly implemented by a combination thereof. The software module may be resident on a RAM, a flash memory, a ROM, an EPROM, an EEPROM, a resistor, a hard disk, a removable disk, a CD-ROM, or any other type of record medium known to those skilled in the art. An exemplary record medium is coupled to a processor and the processor may read information from the record medium and may record the information in a storage medium. In another way, the record medium may be integrally formed with the processor. The processor and the record medium may be resident within an application specific integrated circuit (ASIC). The ASIC may be resident within a user's terminal.

In addition, in describing an embodiment, if a description of a related known art in detail is deemed to unnecessarily obscure the substance of the present disclosure, description of such art may be omitted. Also, it should be understood that the accompanying drawings are used for convenience of explaining the disclosed embodiments, and the technical concepts of the present disclosure are not necessarily limited by the accompanying drawings, and that the accompanying drawings include all the modifications, equivalents, or replacements thereof included in the spirit and technical scope of the disclosure.

While terms such as the first and the second, etc., may be used to describe various components, the components are not necessarily limited by the terms mentioned above. The terms may be used only for distinguishing between one component and other components.

What one component is referred to as being 'connected to' or 'accessed to' another component includes both a case where one component is directly connected or accessed to another component and a case where a further another component is interposed between them. Meanwhile, what one component is referred to as being 'directly connected to' or 'directly accessed to' another component indicates that a further another component is not interposed between them.

Prior to a detailed description of the present disclosure, terms used in the present disclosure may be defined as follows.

A vehicle may be one that is provided with Automated Driving System (ADS) and is capable of autonomous driving. For example, a vehicle may perform steering, acceleration, deceleration, lane change, stopping by the ADS, or any combination thereof, without a driver's manipulation. For example, an ADS may include, for example, Pedestrian Detection and Collision Mitigation System (PDCMS), Lane Change Decision Aid System (LCDAS), Land Departure Warning System (LDWS), Adaptive Cruise Control (ACC), Lane Keeping Assistance System (LKAS), Road Boundary Departure Prevention System (RBDPS), Curve Speed Warning System (CSWS), Forward Vehicle Collision Warning System (FVCWS), Low Speed Following (LSF), Collision Evasive Lateral Maneuver Systems (CELM), or any combination thereof.

A lane may refer to a left lane and/or a right lane defining a driving lane of a vehicle.

Collision avoidance lateral maneuver systems (CELM) may refer to systems that control a lateral movement of a vehicle in its lane to avoid collisions with nearby vehicles. That is, a CELM system may refer to a system that allows a vehicle to move in a lateral direction for collision avoidance within a range of not invading outer edges of a lane on both sides of a lane in which the vehicle is driving.

FIG. 1 is a block diagram of a vehicle according to various embodiments of the present disclosure.

The configuration of the vehicle 100 shown in FIG. 1 is one embodiment, and each component may be configured as one chip, one component, or one electronic circuit, or a combination of chips, components, and/or electronic circuits. According to the embodiment, some of the components shown in FIG. 1 may be divided into a plurality of components and configured as different chips, different components, or different electronic circuits, and some components may be combined to form one chip, one component, or one electronic circuit. According to an embodiment, some of the components shown in FIG. 1 may be omitted or other components not shown may be added. In the description below, at least some of the components of FIG. 1 will be described with reference to FIGS. 2 to 11.

Referring to FIG. 1, a vehicle 100 may include a sensor unit 110, a processor 120, a vehicle control apparatus 130, and a storage 140.

According to various embodiments, the sensor unit 110 may sense surrounding environment of the vehicle 100 using at least one sensor provided in the vehicle 100 and generate surrounding environment information of the vehicle based on sensing result. According to an embodiment, the sensor unit 110 may obtain surrounding environment information including nearby object information and road information based on sensing data obtained from at least one sensor. The nearby object information may include a type of an object, a position of an object, an angle of an object, a size of an object, a shape of an object, a distance to an object, a moving speed of an object, a moving direction of an object, a relative speed of an object to the own vehicle, or any combination thereof. The nearby object may include, for example, a nearby vehicle, pedestrian, bicycle, electric scooter, or any combination thereof. Road information may include lane information and/or shoulder information. The lane information may include information on a lane location, lane curvature, lane curvature change rate, lane slope, road slope, or any combination thereof. The shoulder information may include information on whether a shoulder exists, a location of a shoulder, a size of a shoulder, a length of a shoulder, or any combination thereof.

Figure 2:
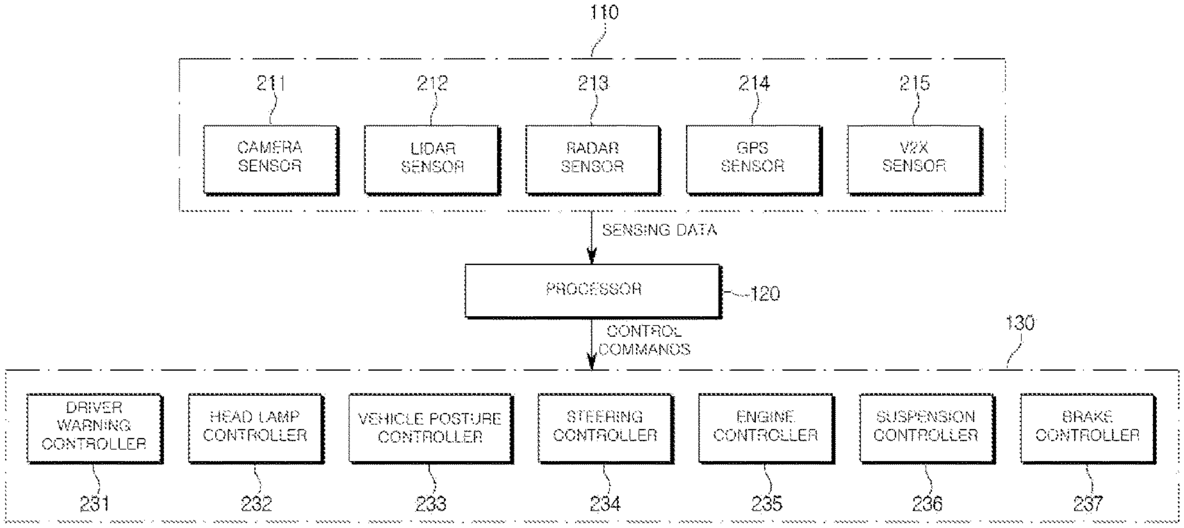
FIG. 2 is an example illustration diagram showing components of a vehicle according to various embodiments of the present disclosure.

According to an embodiment, the sensor unit 110 may measure a position of the vehicle 100 using at least one sensor. As illustrated in FIG. 2, the sensor unit 110 may include, for example, a camera sensor 211, a light detection and ranging (LIDAR) sensor 212, a radio detection and ranging (RADAR) sensor 213, a GPS sensor 214, a V2X sensor 215, or any combination thereof. The sensors illustrated in FIG. 2 are only examples for easy understanding, and the sensors of an embodiment are not necessarily limited thereto. For example, although not illustrated in FIG. 2, the sensor unit 110 may include an infrared sensor.

The camera sensor 211 may be a device sensing an image of a subject captured through a lens, processing the sensed image, and outputting processed image data. The camera sensor 211 may include an image sensor and an image processor. Such a camera sensor 211 may sense a forward view, a side view, and a backward view. For this, a plurality of cameras may be mounted in the vehicle 100 to form the camera sensor 211.

Using a laser, the lidar sensor 212 may measure a distance, speed, and/or angle of a nearby object. Using a laser, the lidar sensor 212 may sense a nearby object in a forward region, a side region, and/or a backward region of the vehicle 100.

The radar sensor 213 may measure a distance, speed, or angle of a nearby object, using electromagnetic waves. The radar sensor 213 may sense nearby objects located in a forward region, a side region, and/or a backward region of the vehicle 100, using electromagnetic waves.

The GPS sensor 214 may be a device capable of detecting the position and measuring the speed of a vehicle and time communicating with a satellite. For example, the GPS sensor 214 may be a device that measures the delay time of radio waves emitted from the satellite and obtains the current position from the distance to the orbit.

The V2X sensor 215 may be a device executing vehicle-to-vehicle communication (V2V), vehicle-to-infrastructure communication (V2I), and vehicle-to-mobile communication (V2M). The V2X sensor 215 may include a transceiver capable of transmitting and receiving radio frequencies. An example of V2X communication may include a radio communication method such as 4G/LTE, 5G, Wi-Fi, Bluetooth, and the like. The V2X sensor 215 may receive information such as location, movement speed, and the like of other vehicles for example, may receive traffic information such as traffic congestion, occurrence or non-occurrence of an accident ahead, and the like for example, and may receive entertainment information such as video streaming, music streaming, news, and the like, for example.

According to various embodiments, the processor 120 may control the overall operation of the vehicle 100. According to an embodiment, the processor 120 may be an electrical control unit (ECU) capable of integrally controlling components in the vehicle 100. For example, the processor 120 may include a central processing unit (CPU) or micro processing unit (MCU) capable of performing arithmetic processing.

According to various embodiments, the processor 120 may determine an avoidance behavior type of an own vehicle for avoiding a collision with a nearby object in a lane based on the surrounding environment information obtained from the sensor unit 110. The processor 120 may determine the final avoidance trajectory of the own vehicle according to the determined avoidance behavior type based on the surrounding environment information.

Figure 3:
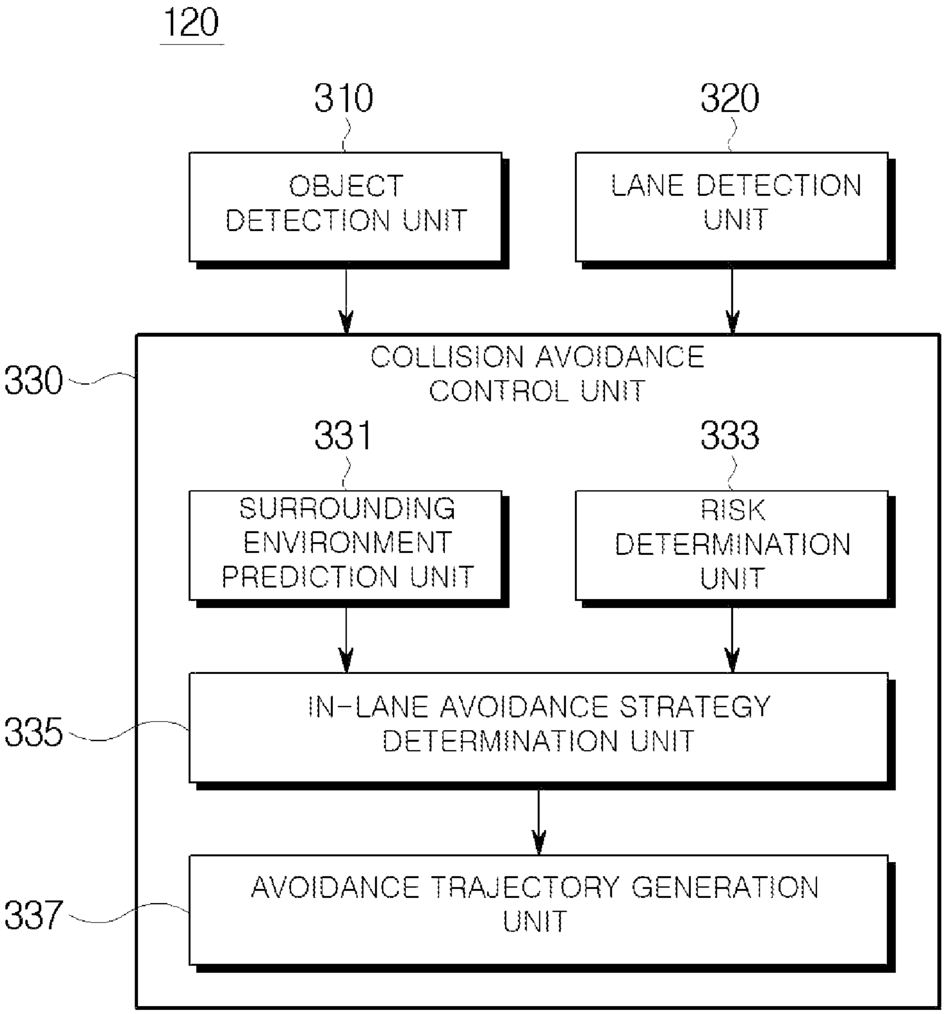
FIG. 3 is a detailed configuration diagram according to various embodiments of the present disclosure.

According to various embodiments, as illustrated in FIG. 3, the processor 120 may include an object detection unit 310, a lane detection unit 320, and a collision avoidance control unit 330 to determine an avoidance behavior type for avoiding collisions in a lane based on nearby object information and lane information, and to determine the final avoidance trajectory of the own vehicle according to the avoidance behavior type.

According to various embodiments, the object detection unit 310 may detect nearby object information from the surrounding environment information provided from the sensor unit 110, and the lane detection unit 320 may detect road information from the surrounding environment information provided from the sensor unit 110.

According to various embodiments, the collision avoidance control unit 330 may include a surrounding environment prediction unit 331, a risk determination unit 333, an in-lane avoidance strategy determination unit 335, and an avoidance trajectory generation unit 337. The collision avoidance control unit 330 may determine an avoidance behavior type of the own vehicle based on the nearby object information and road information provided from the object detection unit 310 and the lane detection unit 320, and determine the final avoidance trajectory of the own vehicle according to the determined avoidance behavior type.

According to various embodiments, the surrounding environment prediction unit 331 of the collision avoidance control unit 330 may predict changes in the surrounding environment based on nearby object information and lane information. In addition to the nearby object information and lane information, the collision avoidance control unit 330 may predict changes in the surrounding environment by further considering road map information previously stored in the vehicle or obtained through the V2X sensor 215, and the intention information of surrounding vehicles (e.g., cutting-in). Changes in the surrounding environment may include, for example, changes in positions of nearby objects.

Figure 4:
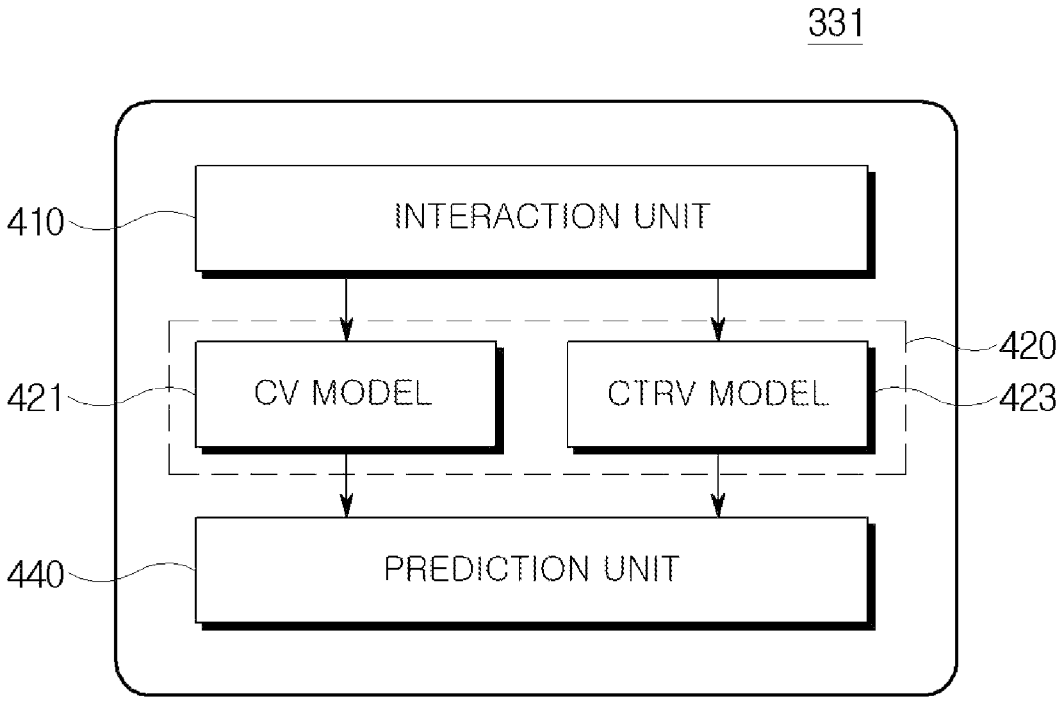
FIG. 4 is a configuration diagram of a surrounding environment prediction unit according to various embodiments of the present disclosure.

According to an embodiment, the surrounding environment prediction unit 331 may predict position changes of nearby objects (e.g., nearby vehicles) using an Interaction Multiple Model (IMM) based on an unscented Kalman filter (UKF). A description of the IMM based on the UKF is in a paper of IMM-Based Lane-Change Prediction in Highways With Low-Cost GPS/INS. The surrounding environment prediction unit 331 may include, for example, an interaction unit 410, an unscented Kalman filter unit 420, and a prediction unit 440, as illustrated in FIG. 4, to predict changes in the positions of surrounding vehicles based on nearby object information. First, the interaction unit 410 may calculate a model probability based on nearby object information obtained through the sensor unit 110 and/or the object detection unit 310, and transition the mode based on a Markovian process. The unscented Kalman filter unit 420 may calculate a state value of a nearby object using a CV model (constant velocity mode) 421 for predicting straight driving, and a constant turn rate and velocity (CTRV) model 423 for predicting a lane change. The prediction unit 440 may predict a change in a position of a nearby vehicle by combining state values of the nearby objects predicted by the unscented Kalman filter unit 420.

According to an embodiment, using the surrounding environment prediction unit 331, the collision avoidance control unit 330 may generate a simplified bird's eye view (SBEV) image based on nearby object information, road information, and information on predicted position change of nearby objects. For example, when the own vehicle 100 and nearby vehicles 501 and 502 are driving as illustrated on a left side of FIG. 5, the collision avoidance control unit 330 may generate a simplified bird's eye view image as illustrated on a right side of FIG. 5. In the simplified bird's eye view image, the nearby vehicles 501 and 502 located within a region of interest (ROI) of the own vehicle 100 may be expressed as black rectangular objects. In addition, in the simplified bird's eye view image, a lane 511 may be expressed as a thick solid line having a first color (e.g., green), a shoulder 512 may be expressed as a thin solid line having a second color (e.g., black), and the lane 511 and the shoulder 512 may be visually distinguished. In addition, in the simplified bird's eye view image, a predicted trajectory for a behavior of the nearby vehicle 501 may be represented by a dashed line. A predicted trajectory for the behavior of the nearby vehicle 501 and 502 (hereinafter, referred to as a 'first predicted trajectory') may be generated based on information on predicted position change of nearby vehicles. In the simplified bird's-eye view image, position information of the last time-point among information on predicted position change of the nearby vehicle 501 and 502 may be expressed as a dashed rectangle 531 and 532.

According to various embodiments, the risk determination unit 333 of the collision avoidance control unit 330 may calculate a degree of a risk of collision between the vehicle 100 and a nearby object based on the nearby object information provided from the object detection unit 310. According to an embodiment, a degree of a risk of collision between the vehicle 100 and a nearby vehicle may be determined based on a longitudinal distance between the own vehicle and a nearby vehicle, a longitudinal relative velocity of a nearby vehicle, a stopping distance considering a reaction time until a driver applies a brake, a delay time of braking system hardware, the maximum longitudinal deceleration of the vehicle, or any combination thereof.

In order to calculate a degree of a risk of collision between the vehicle 100 and nearby vehicles, the risk determination unit 333 may calculate a time to collision (TTC) as in Equation 1 below, and warning index ($x_p$) as in Equation 2 below.

$$TTC = \frac{x}{v_{rel}} \quad \text{[Equation 1]}$$

In Equation 1, x may represent the longitudinal distance between the own vehicle and a nearby vehicle, and $v_{rel}$ may represent the longitudinal relative velocity of a nearby vehicle.

$$x_p = \frac{p_{long} - d_{br}}{d_w - d_{br}} \quad \text{[Equation 2]}$$

In Equation 2, $p_{long}$ may represent a distance 601 (see FIG. 6) between the vehicle 100 and a nearby vehicle 600. In addition, $d_{br}$ may be a braking-critical distance 621 until the vehicle stops when the vehicle moves with a uniform acceleration at maximum deceleration, and $d_w$ may be a stopping distance 611 considering a reaction time until a driver applies a brake in $d_{br}$. Here, $d_{br}$ may be expressed as in Equation 3 below, and $d_w$ may be expressed as in Equation 4 below.

$$d_{br} = v_{rel} \cdot t_{brake} - \frac{v_{rel}^2}{2a_{x,maax}} \quad \text{[Equation 3]}$$

$$d_w = v_{rel} \cdot t_{thinking} + v_{rel} \cdot t_{brake} - \frac{v_{rel}^2}{2a_{x,maax}} \quad \text{[Equation 4]}$$

In Equation 3 and/or 4, $v_{rel}$ may represent the longitudinal relative velocity of a nearby vehicle, and $t_{brake}$ may represent the system delay time of a hardware of the braking system. In addition, $a_{x,maax}$ may be the maximum longitudinal deceleration of the vehicle, and $t_{thinking}$ may be the reaction time that takes until the driver steps on the brake.

According to the Equation 2 described above, when the distance $p_{long}$ 601 between the own vehicle 100 and the other vehicle is greater than $d_w$ 611, the warning index $x_p$ has a positive value, which may mean that there is no risk of collision.

The risk determination unit 333 may calculate a longitudinal collision risk index $I_{long}$ as shown in Equation 5 below, using the time to collision (TTC) and the warning index $x_p$ calculated based on Equations 1 to 4.

$$I_{long} = \max\left(\frac{|x_{max} - x_p|}{|x_{max} - x_{th}|}, \frac{|TTC^{-1}|}{|TTC_{th}^{-1}|}\right) \quad \text{[Equation 5]}$$

In Equation 5, $x_{max}$ may be the maximum value of the warning index, $x_{th}$ may be a threshold value of the warning index, and $$TTC_{th}^{-1}$$

may be a threshold value of $TTC^{-1}$.

The risk determination unit 333 may calculate a lateral collision risk index $I_{lat}$ by using Equation 7, after calculating a time to lane crossing (TLC) as in Equation 6.

$$TLC = \frac{y}{v_y} \quad \text{[Equation 6]}$$

In Equation 6, y may be the lateral relative position of the nearby vehicle, and $v_y$ may be the lateral relative velocity of the nearby vehicle.

$$I_{lat} = \min(I_{long}, 1) \cdot \min\left(\frac{TLC_{th}}{TLC}, 1\right) \quad \text{[Equation 7]}$$

In Equation 7, $TLC_{th}$ may be a threshold value of TLC. The lateral collision risk index $I_{lat}$, calculated by using Equation 7, may have a value between 0 and 1, and the closer to 1, the higher the risk of collision may be.

The threshold values included in the above Equations may be set based on virtual accident data generated through a simulation test. For example, $$TTC_{th}^{-1}$$

and $TLC_{th}$ may be set to 0.5.

That is, the risk determination unit 333 may calculate a degree of a risk of collision that includes the lateral collision risk index ($I_{lat}$) and/or the longitudinal collision risk index ($I_{long}$), based on at least one among Equations 1 to 7.

According to various embodiments, the in-lane avoidance strategy determination unit 335 of the collision avoidance control unit 330 may determine an avoidance behavior type of the own vehicle in order to avoid collision in the lane with a nearby vehicle based on the simplified bird's eye view image, the degree of a risk of collision, and vehicle performance status. The avoidance behavior type may include a decelerating (DEC) type, evasive steering to right (ESR) type, evasive steering to left (ESL) type, or any combination thereof. The DEC type may be a type that avoids collisions with nearby vehicles by using only longitudinal deceleration without lateral manipulation. The ESR type may be a type that avoids collisions with nearby vehicles by performing a behavior of steering to the right in the lane, and ESL type may be a type that avoids collisions with nearby vehicles by performing a behavior of steering to the left in the lane.

Figure 7:
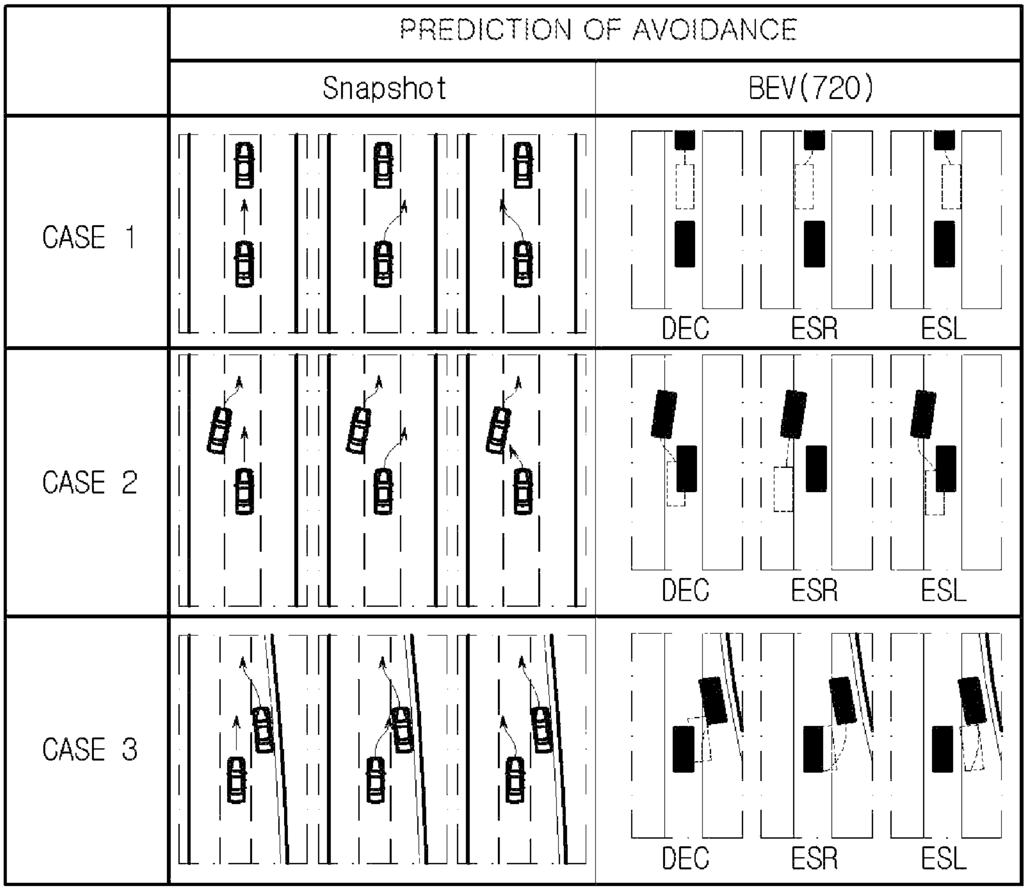
FIG. 7 is an example illustration of determining an avoidance behavior type based on a bird's eye view images in which a predicted trajectory of a behavior of nearby objects and a degree of a risk of collision are reflected according to various embodiments of the present disclosure.

According to an embodiment, the in-lane avoidance strategy determination unit 335 may generate bird's eye view (BEV) images 700 for each avoidance behavior type as illustrated in FIG. 7, using the simplified bird's eye view images and degree of a risk of collision. The bird's eye view (BEV) images 700 for each avoidance behavior may include a bird's eye view image of the DEC type, a bird's eye view image of the ESR type, and a bird's eye view image of the ESL type. Each of the bird's-eye view images 700 for each avoidance behavior type may include a predicted trajectory (hereinafter referred to as a 'second predicted trajectory') representing the relative behavior of the nearby vehicle to the own vehicle, and accordingly, may represent collision avoidance prediction results. The second predicted trajectory may indicate a relative position change of the nearby vehicles predicted when the own vehicle performs the corresponding avoidance behavior type. The second predicted trajectory may be determined based on, for example, the predicted trajectory of the behavior of the nearby vehicle and the avoidance trajectory of the own vehicle according to the avoidance behavior type. In addition, the bird's eye view images 700 for each type of avoidance behavior may indicate a degree of a risk of collision with a nearby object through the display brightness of the nearby object. For example, the in-lane avoidance strategy determination unit 335 may process the bird's eye view image such that objects with a low collision risk are displayed in red with relatively low brightness, and objects with a high collision risk are displayed in red with relatively high brightness.

Figure 8A:
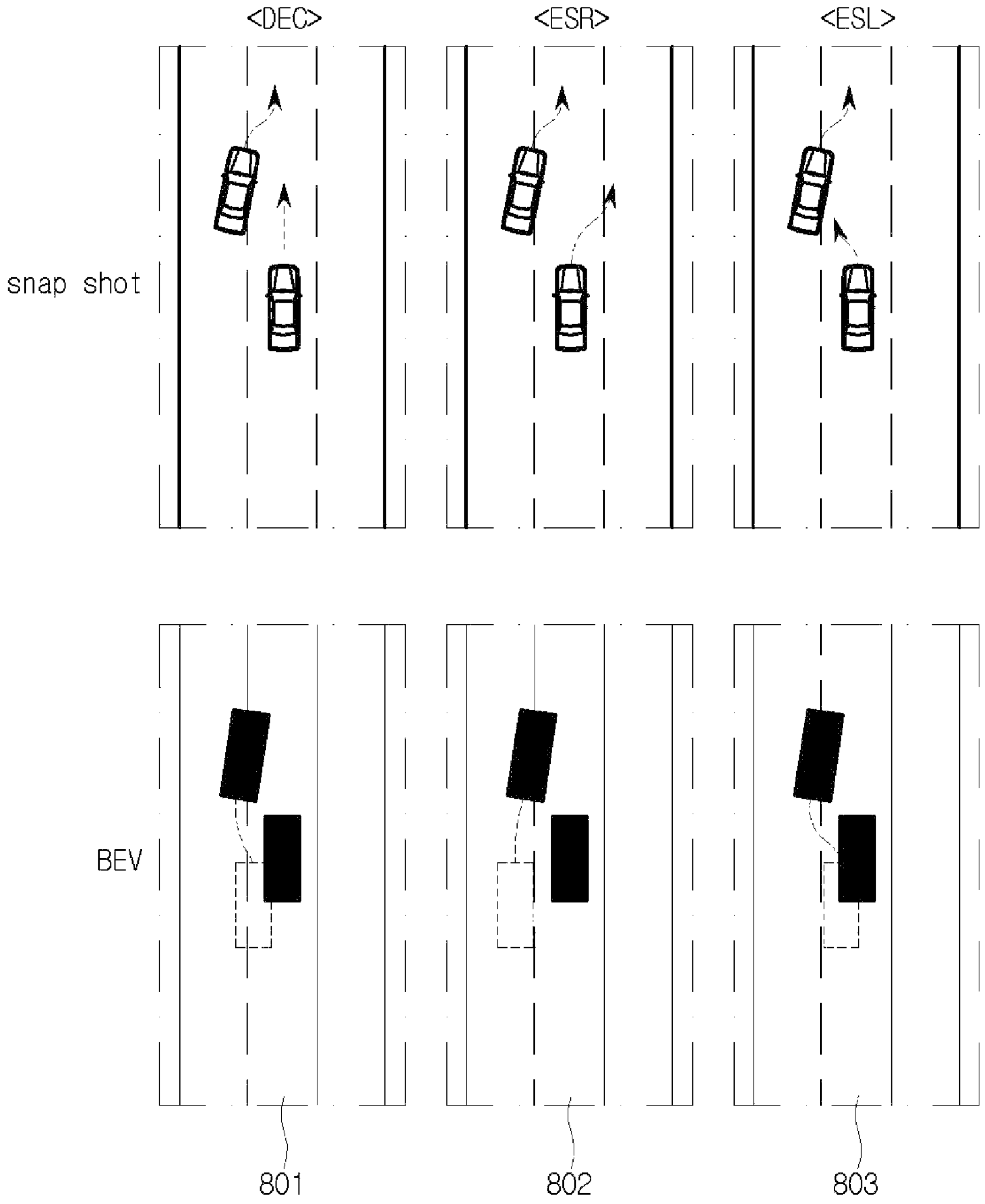
FIGS. 8A and 8B are example illustrations showing a predicted trajectory for a behavior of nearby objects generated based on road information according to various embodiments of the present disclosure.
Figure 8B:
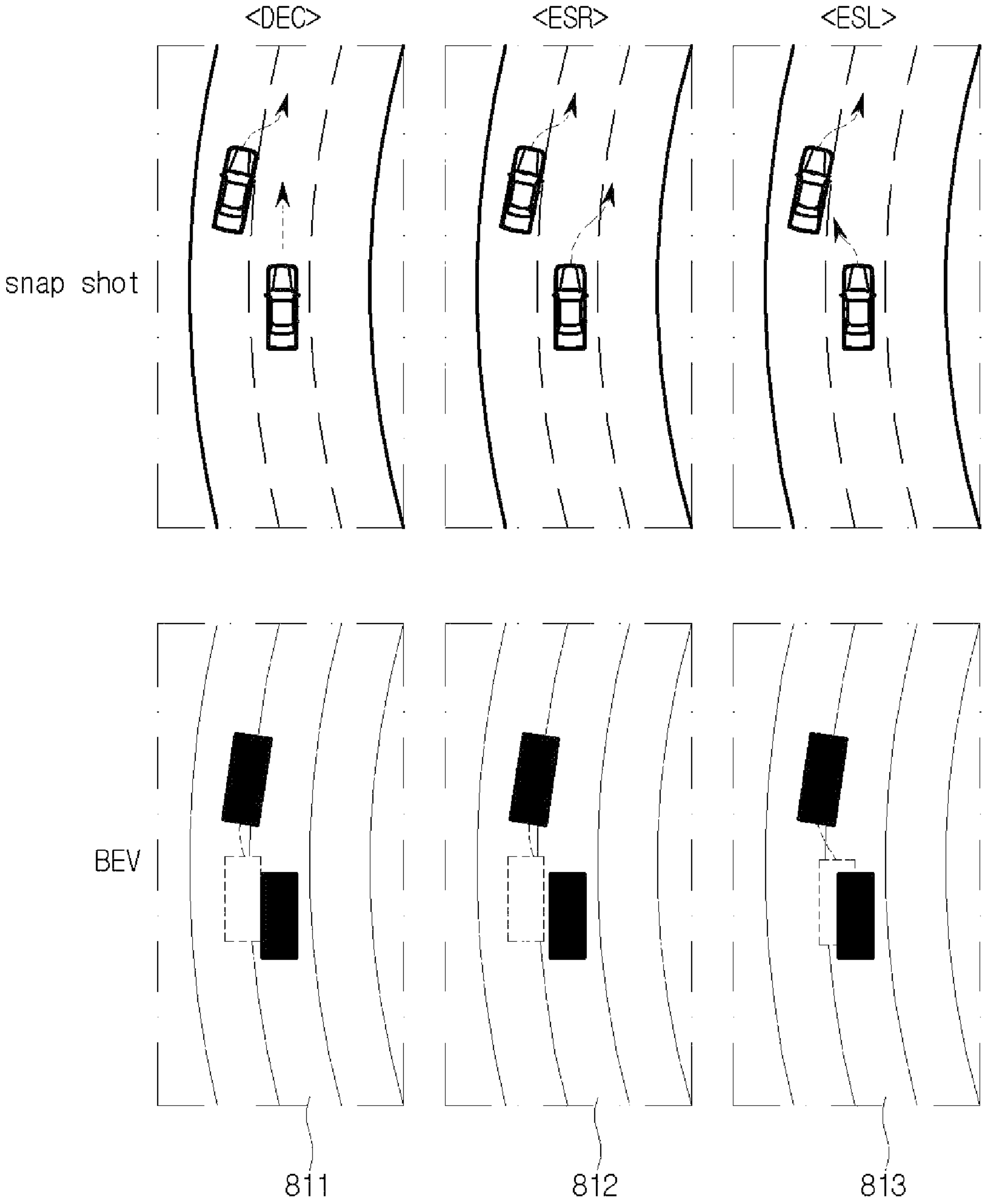

According to an embodiment, the in-lane avoidance strategy determination unit 335 may further reflect road information when determining the second predicted trajectory. This is because the lane change trajectory and/or avoidance trajectory for each type of the avoidance behavior on a straight road as illustrated in FIG. 8A is different from the lane change trajectory and/or avoidance trajectory for each type of the avoidance behavior on a curved road as illustrated in FIG. 8B. Accordingly, the in-lane avoidance strategy determination unit 335 may determine the second predicted trajectory, which is a predicted trajectory representing the relative behavior of nearby vehicles, by additionally considering curvature information of the road on which the own vehicle and nearby vehicles are driving.

According to an embodiment, the in-lane avoidance strategy determination unit 335 may confirm a collision avoidance prediction result for each avoidance behavior type based on the second predicted trajectory included in each of the bird's eye view images 700 for each avoidance behavior type, and determine the avoidance behavior type of the own vehicle based on the collision avoidance prediction result for each confirmed avoidance behavior type. For example, assume that the bird's eye view images 801, 802, 803, 811, 812, and 813 for each avoidance behavior type as illustrated in FIGS. 8A and 8B are generated. The in-lane avoidance strategy determination unit 335 may confirm that collision occurrence is predicted when the DEC type and the ESL type are performed, based on the second predicted trajectory included in the DEC type bird's eye view images 801 and 802 and the ESL type bird's eye view images 803 and 813, respectively. In addition, the in-lane avoidance strategy determination unit 335 may confirm that collision avoidance is predicted when the ESR type is performed based on the second predicted trajectory included in the ESR type bird's eye view images 802 and 812. Accordingly, the in-lane avoidance strategy determination unit 335 may determine the ESR type capable of collision avoidance as an avoidance behavior type.

According to various embodiments, the avoidance trajectory generation unit 337 of the collision avoidance control unit 330 may determine the final avoidance trajectory of the own vehicle according to the avoidance behavior type determined by the in-lane avoidance strategy determination unit 335 based on surrounding environment information. For example, by changing the avoidance trajectory according to the avoidance behavior type determined by the in-lane avoidance strategy determination unit 335 using position information of nearby objects, the avoidance trajectory generation unit 337 may generate the final avoidance trajectory. Specifically, the avoidance trajectory generation unit 337 may determine, based on the position information of nearby objects, the maximum allowable distance for the lateral behavior of the own vehicle, that is, the maximum lateral value for the avoidance trajectory, when the avoidance behavior type determined by the in-lane avoidance strategy determination unit 335 is the ESR type or the ESL type. By changing the avoidance trajectory corresponding to the ESR type or ESL type, the in-lane avoidance strategy determination unit 335 may generate the final avoidance trajectory, based on the maximum allowable distance for the lateral behavior.

Hereinafter, a specific method example for determining the avoidance trajectory of the own vehicle according to the avoidance behavior type of the own vehicle by the avoidance trajectory generation unit 337 will be described with reference to FIGS. 9A to 11.

Figure 9A:
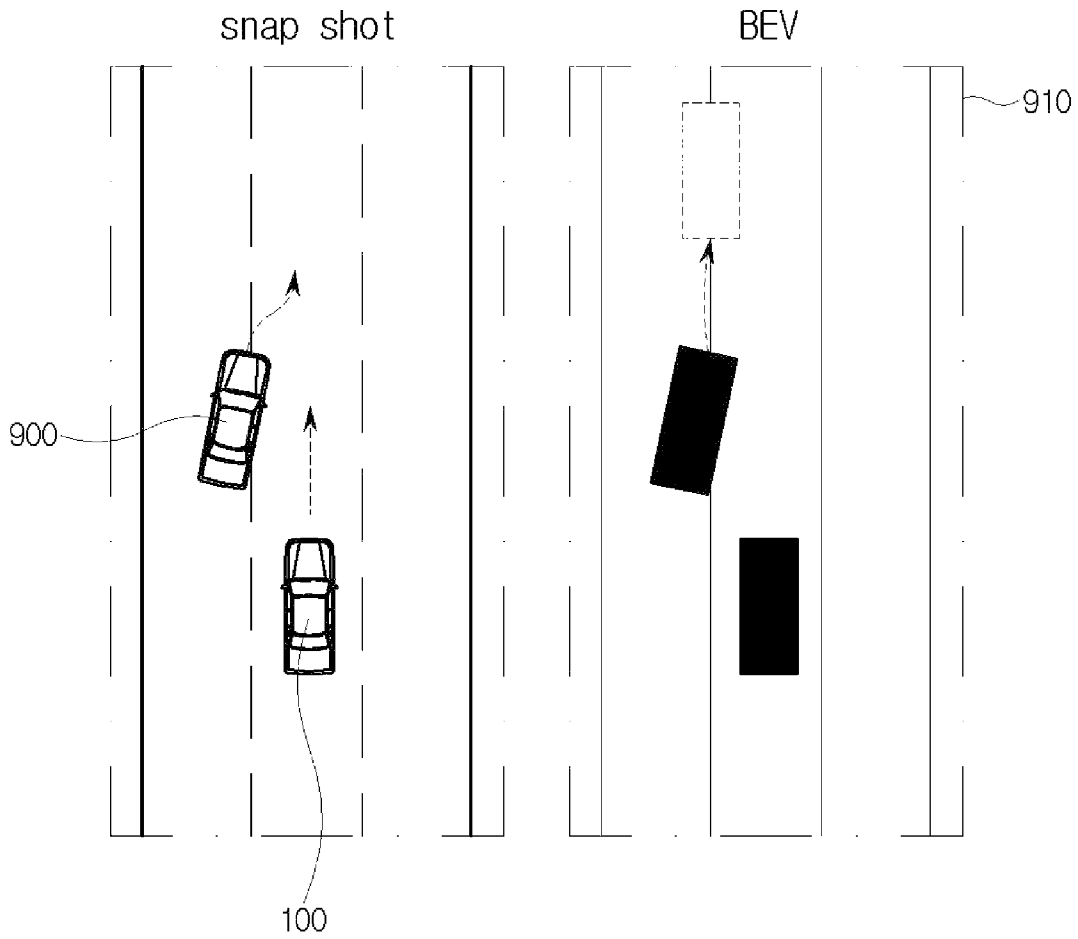
FIGS. 9A and 9B are example illustrations of generating a final avoidance trajectory of an own vehicle according to an avoidance behavior type on a straight road according to various embodiments of the present disclosure.

First, as illustrated in FIG. 9A, assume a case that the nearby vehicle 900 attempts to change a lane to a driving lane of the own vehicle 100 and the avoidance behavior type is the ESR type. Here, the bird's-eye view image 910 of the ESR type illustrated in FIG. 9A only represents the second predicted trajectory in which the avoidance trajectory of the own vehicle according to the ESR type is reflected, and the avoidance trajectory of the own vehicle and the predicted trajectory of the behavior of nearby vehicles (i.e., first predicted trajectory) are not shown separately. Therefore, hereinafter, an example method for determining the final avoidance trajectory for the ESR type by transforming a coordinate system of a bird's eye view image of the ESR type illustrated in FIG. 9A as shown in FIG. 9B will be described.

Figure 9B:
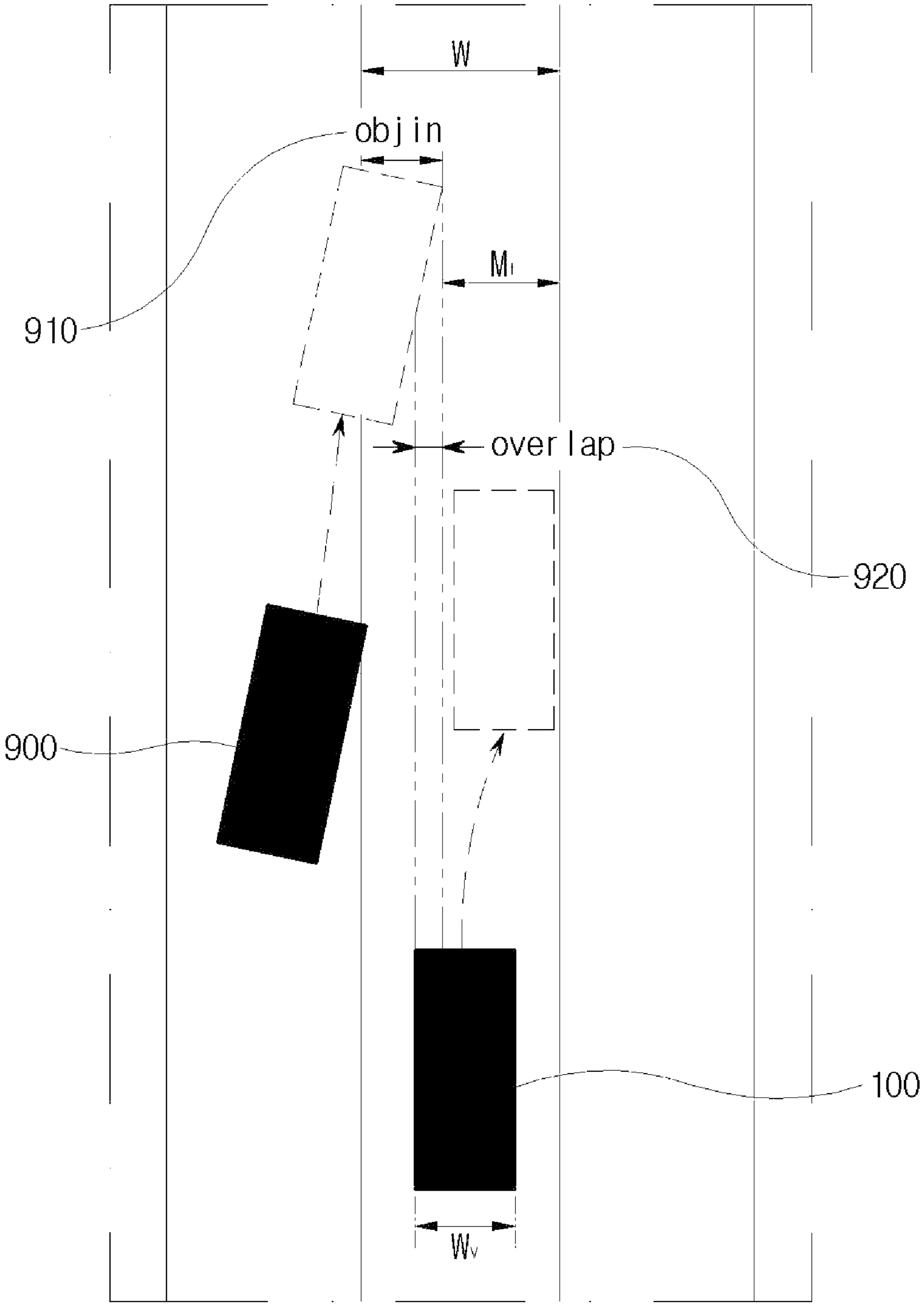

Referring to FIG. 9B, the avoidance trajectory generation unit 337 may generate an operation time of determining collision avoidance in a lane according to a degree of lane invasion (objIn) 910 of the nearby vehicle 900 and a degree of overlap 920 between the own vehicle 100 and the nearby vehicle 900. For example, when Equation 8 below is satisfied, the collision avoidance control unit 330 may initiate an operation for determining whether to avoid collision in a lane.

$$0.5\ \text{m} < objIn < 1.0\ \text{m} \qquad \text{[Equation 8]}$$

$$0.25\ \text{m} < \text{overlap}$$

In Equation 8, objIn may be the degree of lane invasion of the nearby vehicle 900 with respect to a lane in which the own vehicle 100 is travelling, and overlap may be the degree of overlap between the own vehicle 100 and the nearby vehicle 900.

The avoidance trajectory generation unit 337 may determine whether collision avoidance with nearby vehicles is possible based on the maximum allowable distance for the lateral behavior of the own vehicle and the degree of overlap between the own vehicle and nearby vehicles when Equation 8 is satisfied. According to an embodiment, the collision avoidance control unit 330, based on Equation 9 below, may determine the maximum allowable distance for the lateral behavior of the own vehicle.

$$M_t \geq \frac{W - W_v}{2} + y_0 \qquad \text{[Equation 9]}$$

Here, $M_t$ may be the maximum allowable distance for the lateral behavior of the own vehicle, W may be a width of a driving lane, and $W_v$ may be a width of the own vehicle.

The avoidance trajectory generation unit 337 may generate a final avoidance trajectory of the own vehicle by using an avoidance trajectory generation algorithm that uses the maximum allowable distance for the lateral behavior of the own vehicle as an input variable. The avoidance trajectory generation algorithm may be expressed as Equation 10.

$$y_{des}(t) = C_1 \tanh(C_2 t + C_3) + e_{y,0} \qquad \text{[Equation 10]}$$

$$C_1 = \frac{M_t - e_{y,0}}{2},\ C_2 = \sqrt{\frac{a_{y,lim}}{a_{y,0} \cdot C_1}}$$

$$C_3 = \frac{t_{LC}}{2} C_2,\ t_{LC} = \frac{2}{C_2} \tanh^{-1}\left(\frac{M_t - C_1 - e_{y,0}}{C_1}\right)$$

In Equation 10, $y_{des}(t)$ may be the final avoidance trajectory of the own vehicle, $e_{y,o}$ may be the current lateral position of the own vehicle, $a_{y,lim}$ and $a_{y,o}$ may be the maximum lateral acceleration, respectively, and $t_{LC}$ may be the time during which the collision avoidance behavior is performed.

Figure 10A:
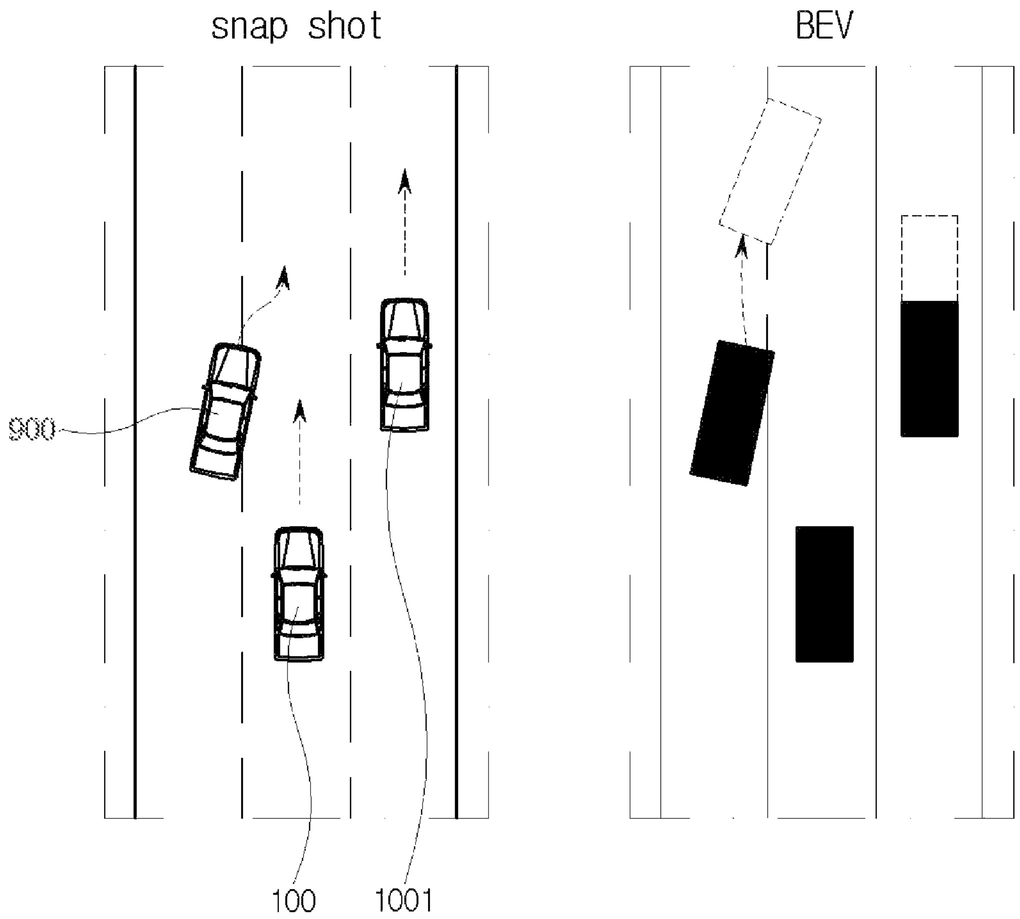
FIGS. 10A and 10B are example illustrations of generating a final avoidance trajectory of an own vehicle when there is another vehicle in an avoidance direction corresponding to an avoidance behavior type on a straight road according to various embodiments of the present disclosure.

FIG. 10A indicates a case where there is another vehicle driving in an avoidance direction corresponding to the avoidance behavior type. That is, FIG. 10A is a case where there is another vehicle 1001 driving in the right lane direction of the own vehicle, when the nearby vehicle 900 attempts to change a lane into the driving lane of the own vehicle 100 and the avoidance behavior type is determined to be the ESR type.

In this case, the avoidance trajectory generation unit 337 may redefine the maximum allowable distance for the lateral behavior of the own vehicle to be inversely proportional to the relative distance to another vehicle 1001, as in Equation 11.

$$M_t \geq \frac{2}{3}\left(rel_y - \frac{W - W_v}{2}\right) + \frac{1}{3} + y_0 = \frac{1}{3}(2rel_v - W + W_v + 1) + y_0 \qquad \text{[Equation 11]}$$

Figure 10B:
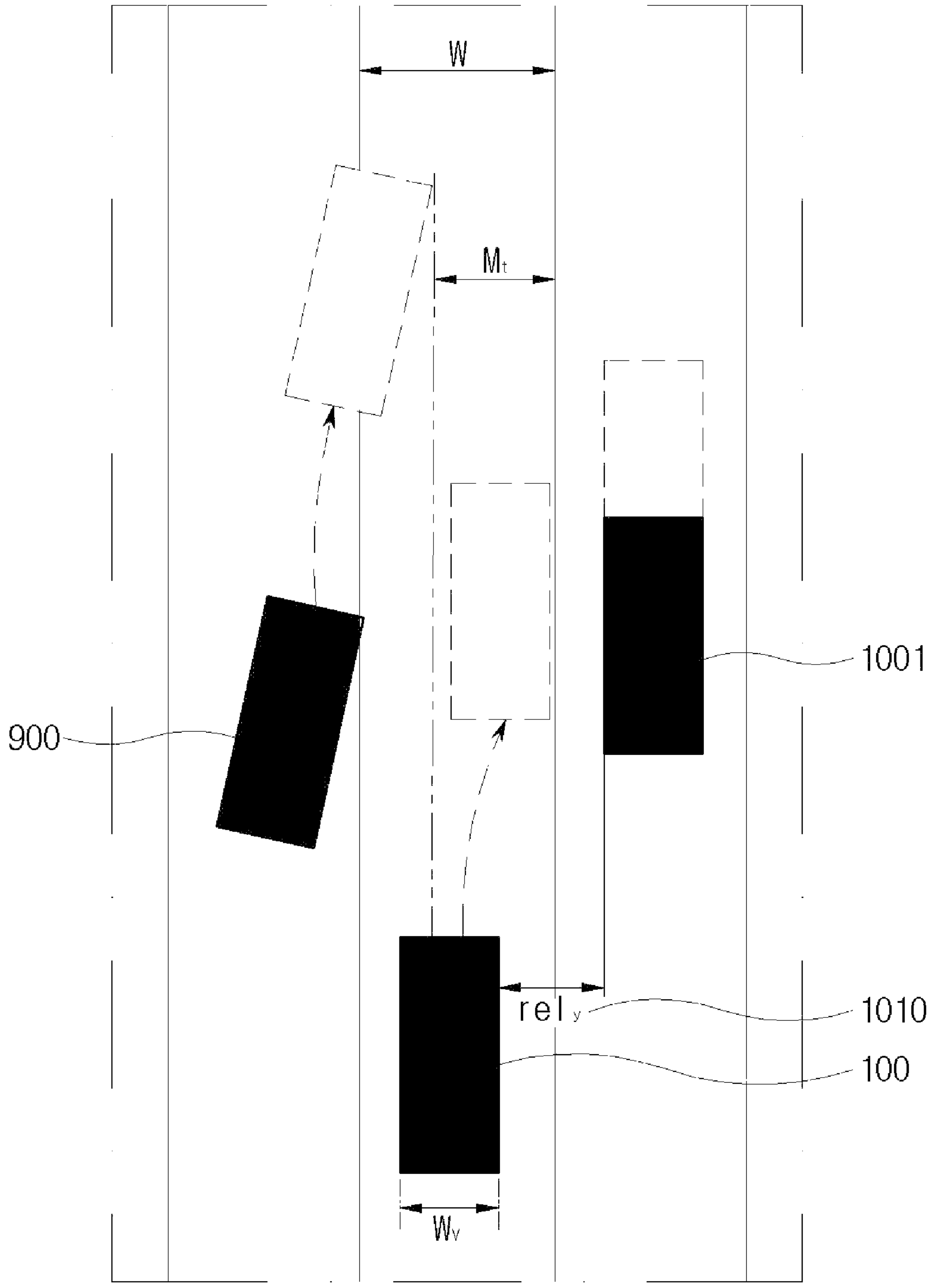

In Equation 11, rely may be a relative lateral distance between the own vehicle and another vehicle located in the avoidance direction corresponding to the avoidance behavior type. For example, rely may be a relative lateral distance 1010 between the own vehicle 100 and another vehicle 1001 positioned in the right direction of the own vehicle 100, as illustrated in FIG. 10B when the avoidance behavior type is ESR. When another vehicle 1001 travels based on the center of the corresponding driving lane, $M_t$ may be applied the same as the maximum allowable distance for the existing lateral behavior. On the other hand, when another vehicle 1001 travels in a position as close as possible to a lane adjacent to the own vehicle 100, $M_t$ may be limited to 0.3 m. Here, it is assumed that a width of another vehicle 1001 is the same as that of the own vehicle.

Figure 11:
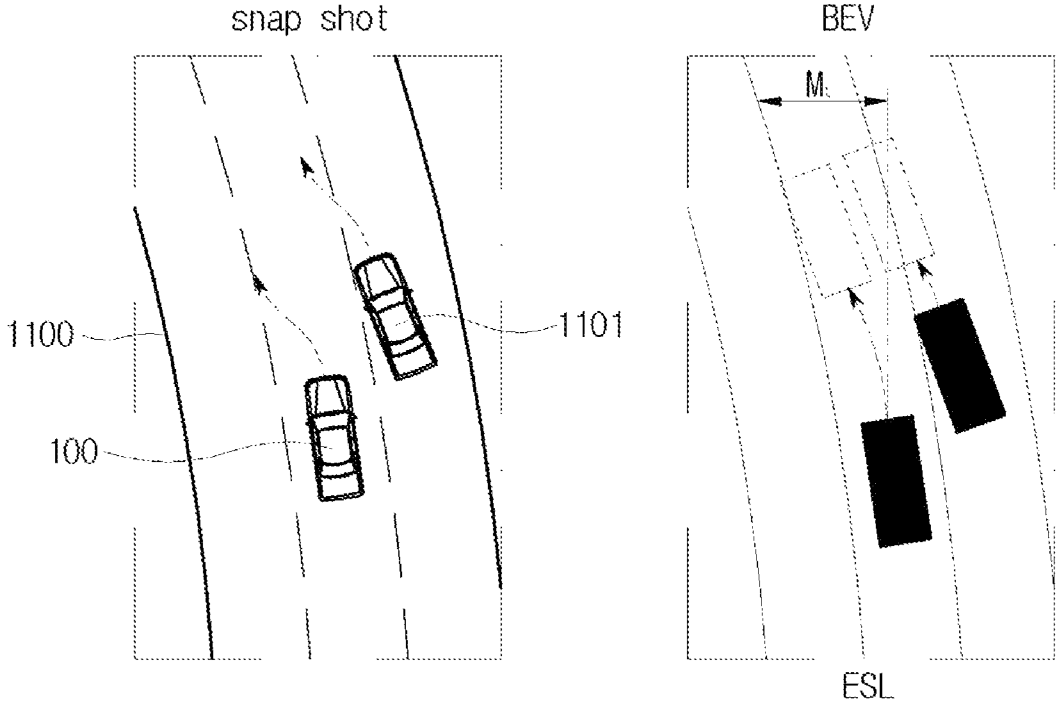
FIG. 11 is an example illustration of generating a final avoidance trajectory of an own vehicle according to an avoidance behavior type on a curved road according to various embodiments of the present disclosure.

FIG. 11 assumes a case where the own vehicle and nearby vehicles travel on a curved road. Here, the nearby vehicle 1101 attempts to change a lane to the driving lane of the own vehicle 100, and the avoidance behavior type is the ESL type, and the final avoidance trajectory of the own vehicle may be generated by considering a curvature of the road as shown in Equation 12.

$$y_{des}(t) = C_1 \tanh(C_2 t + C_3) + e_{y,0} - y_c \qquad \text{[Equation 12]}$$

$$y_c(t) = a_3 x^3(t) + a_3 x^2(t) + a_1 x(t)$$

Here, $a_3$ may be a curvature change rate, $a_2$ may be a curvature, and $a_1$ may be a road slope. That is, the collision avoidance control unit 330 may generate a final avoidance trajectory of the own vehicle by considering a curvature of a road on a curved road.

As described above, when the avoidance behavior type and final avoidance trajectory of the own vehicle are determined, the processor 120 may control the vehicle behavior according to the determined avoidance behavior type and final avoidance trajectory in association with the vehicle control apparatus 130.

The vehicle control apparatus, as illustrated in FIG. 2, may include a driver warning controller 231, a head lamp controller 232, a vehicle posture controller 233, a steering controller 234, an engine controller 235, a suspension controller 236, a brake controller 237, and the like, for example.

The driver warning controller 231 may generate an audio warning signal, a video warning signal, or a haptic warning signal in order to warn a driver of a specific dangerous situation. For example, in order to output a warning sound, the driver warning controller 231 may output a warning sound using a vehicle sound system. Alternatively, in order to display the warning message, the driver warning controller 231 may output a warning message through a HUD display or a side mirror display. Alternatively, in order to generate a warning vibration, the driver warning controller 231 may operate a vibration motor mounted on a steering wheel.

The head lamp controller 232 is located at a front side of the vehicle to control a head lamp for securing a driver's field of view ahead of the vehicle at night. For example, the head lamp controller 232 may perform high beam control, low beam control, left and right auxiliary light control, adaptive head lamp control, or the like.

The vehicle posture controller 233 may be referred to as vehicle dynamic control (VDC) or electrical stability control (ESP), and may perform control to correct the vehicle's behavior through electronic equipment when the vehicle's behavior suddenly becomes unstable due to a road condition or a driver's urgent steering wheel operation. For example, sensors such as a wheel speed sensor, a steering angle sensor, a yaw rate sensor, and a cylinder pressure sensor may sense a steering wheel operation. When the running direction of the steering wheel does not match that of the wheels, the vehicle posture controller 233 may perform control to disperse the braking force of each wheel using an anti-lock braking system (ABS) or the like.

The steering controller 234 may control an electronic power steering system (MPDS) for driving the steering wheel. For example, when the vehicle is expected to collide, the steering controller 234 may control the steering of the vehicle such that the collision may be avoided or such that damage may be minimized. The steering controller 234 may receive a command from the processor 120 requesting to perform an operation according to the determined avoidance behavior type, and may perform a lateral control of the vehicle within the lane according to the received command. At this time, the steering controller 234 may control steering of the vehicle based on the avoidance trajectory of the own vehicle provided from the processor 120.

The engine controller 235 may serve to control elements such as an injector, a throttle, a spark plug, or the like according to control commands when the processor 120 receives data from an oxygen sensor, an air quantity sensor, and a manifold absolute pressure sensor.

The suspension controller 236 may be an apparatus for performing motor-based active suspension control. In detail, by variably controlling the damping force of a shock absorber, the suspension controller 236 may provide smooth ride quality during normal running and may provide hard ride quality during high-speed running or upon posture changes. Thus, it may be possible to ensure ride comfort and driving stability. Also, the suspension controller 236 may perform vehicle height control, posture control, or the like as well as the damping force control.

The brake controller 237 may control whether to operate the brake of the vehicle and may control the pedal effort of the brake. For example, when a forward collision is probable, the brake controller 237 may perform control so that emergency braking is automatically activated according to a control command of the processor 120 irrespective of whether the driver operates the brake. The brake controller 237 may also control a lateral movement of the vehicle by generating a lateral brake control. For example, when a braking force is generated only on a left wheel by the brake controller 237, the vehicle moves in the left direction, and when braking force is generated only on a right wheel, the vehicle may move in the right direction. For example, the brake controller 237 may receive a CELM execution command from the processor 120 and may control the lateral movement of the vehicle such that the vehicle moves leftward or rightward according to the received CELM command. At this time, the brake controller 237 may control the lateral movement of the vehicle based on the lateral movement distance received from the processor 120.

According to various embodiments, the storage 140 (see FIG. 1) may store various programs and data for operating the vehicle and/or the processor 120. According to an embodiment, the storage 140 may store various programs and data required for collision avoidance within a lane.

Figure 12:
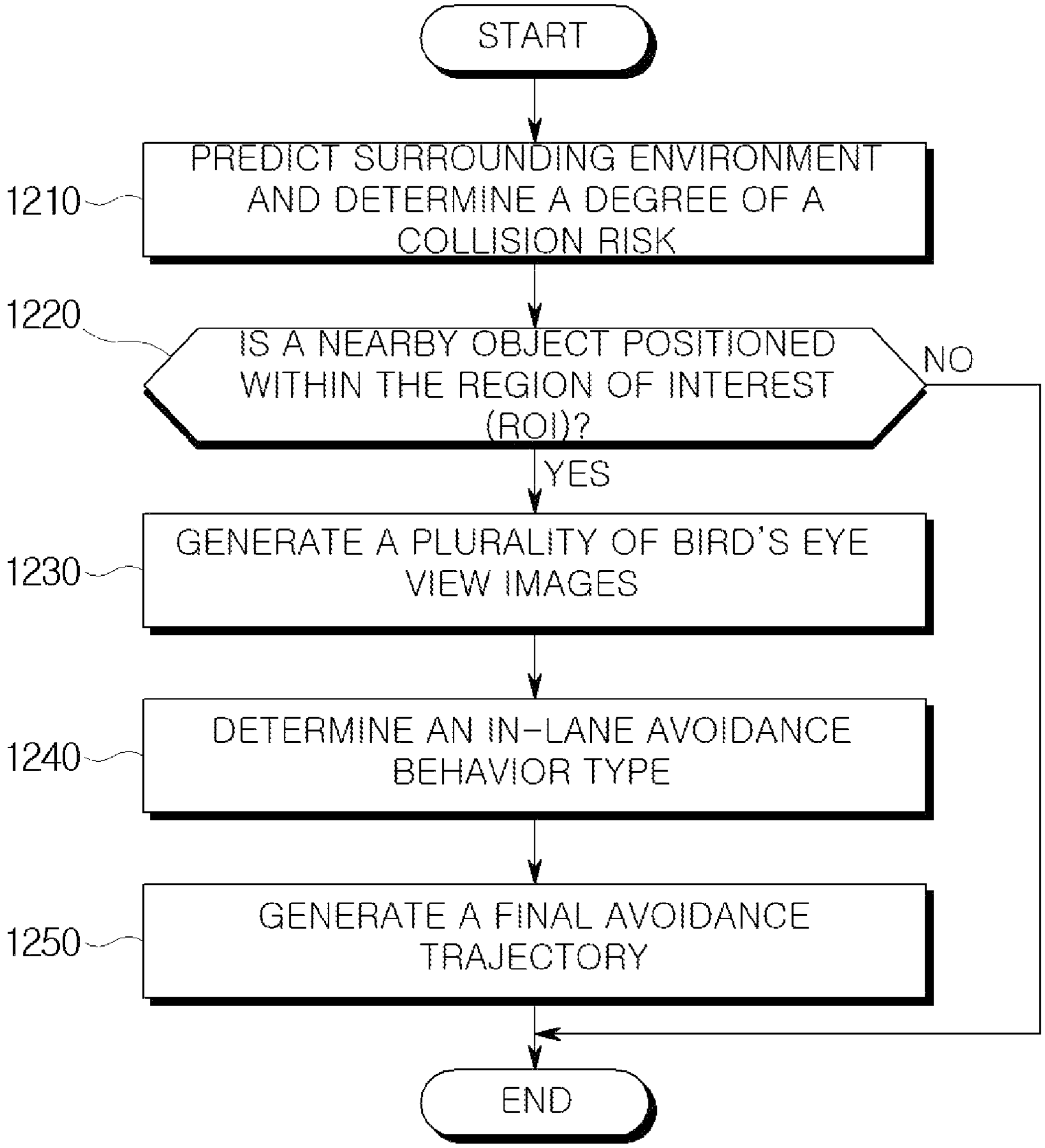
FIG. 12 is a flowchart for a vehicle that determines an avoidance behavior type for avoiding collision in a lane and generates a final avoidance trajectory of an own vehicle according to various embodiments of the present disclosure.

FIG. 12 is a flowchart for the vehicle that determines an avoidance behavior type for avoiding collision in a lane according to various embodiments of the present disclosure. In the following embodiment, the operations may be sequentially performed, but are not necessarily sequentially performed. For example, the sequential position of each operation may be changed, or at least two operations may be performed in parallel. In addition, the following operations may be performed by the processor 120 and/or at least one other component (e.g., sensor unit 110) provided in the vehicle 100, or may be implemented as instructions executable by the processor 120 and/or at least one other component (e.g., sensor unit 110).

Figure 5:
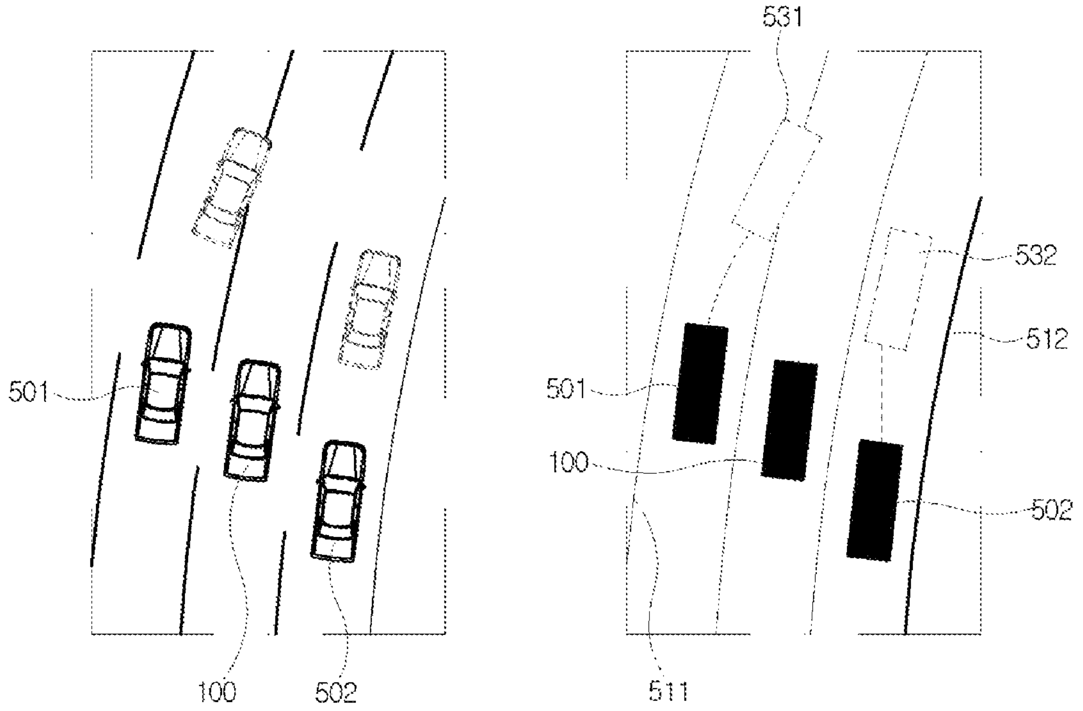
FIG. 5 is an example illustration showing a simplified bird's eye view image generated according to various embodiments of the present disclosure.
Figure 6:
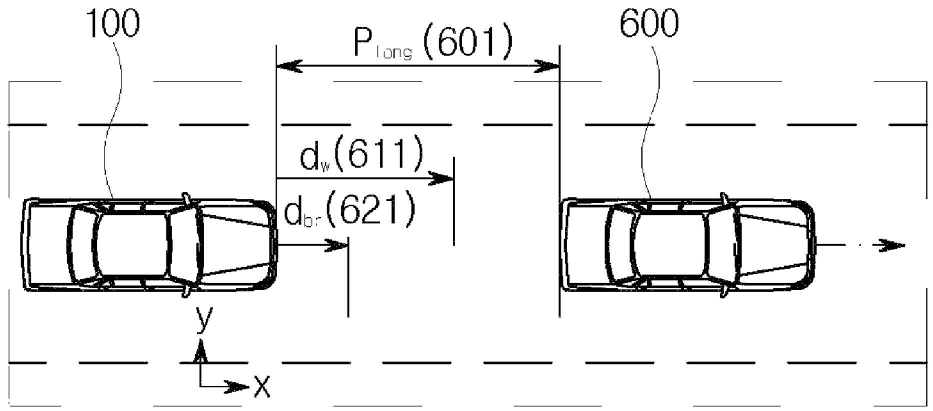
FIG. 6 is an illustration showing a distance relationship between an own vehicle and nearby vehicles for calculating a degree of a risk of collision according to various embodiments of the present disclosure.

Referring to FIG. 12, in operation 1210, the vehicle 100 may predict the surrounding environment and determine the degree of a collision risk. According to an embodiment, the vehicle 100 may acquire the nearby object information and road information based on sensing data obtained through the sensor unit 110, and may predict changes in the surrounding environment based on the obtained nearby object information and road information. For example, the vehicle 100 may predict position change information of the nearby objects based on the nearby object information and road information at the current point in time. According to an embodiment, the vehicle 100 may generate a simplified bird's eye view (SBEV) image based on nearby object information, road information, and predicted position change information of nearby objects. The simplified bird's eye view image may be created as illustrated in FIG. 5. According to an embodiment, the vehicle 100 may calculate a degree of a risk of collision between the vehicle and the nearby object based on the nearby object information. The degree of a risk of collision may be calculated based on at least one among Equations 1 to 7. The degree of a risk of collision may include the longitudinal collision risk index and/or the lateral collision risk index.

In operation 1220, the vehicle 100 may determine whether the nearby object is positioned within the region of interest (ROI). For example, the vehicle 100 may determine whether the nearby object sensed through the sensor unit 110 is positioned within a preset region of interest of the vehicle. Whether the vehicle 100 is positioned within the region of interest may be determined based on sensing data obtained through the sensor unit 110.

When the nearby object is not positioned within the ROI, the vehicle 100 may end procedure of the operation in FIG. 12.

When a nearby object is positioned within the region of interest, the vehicle 100 may generate a plurality of bird's eye view images in operation 1230. The plurality of bird's eye view images may include bird's eye view images for each avoidance behavior type. For example, as shown in FIG. 7, the vehicle 100 may generate a bird's eye view image in a DEC type, a bird's eye view image in an ESR type, and a bird's eye view image in an ESL type. Each of the plurality of bird's eye view images may include a predicted trajectory representing the relative behavior of nearby vehicles, that is, a second predicted trajectory. The second predicted trajectory may be determined based on the first predicted trajectory, which is a predicted trajectory for the behavior of nearby vehicles, and an avoidance trajectory of the own vehicle according to an avoidance behavior type.

In operation 1240, the vehicle 100 may determine an in-lane avoidance behavior type using a plurality of bird's eye view images. The vehicle may confirm a collision avoidance prediction result for each avoidance behavior type based on the second predicted trajectory included in the plurality of bird's eye view images, and determine an avoidance behavior type capable of collision avoidance as the avoidance behavior type of the own vehicle.

In operation 1250, the vehicle 100 may generate a final avoidance trajectory based on the in-lane avoidance behavior type. The vehicle 100 may determine the final avoidance trajectory of the own vehicle according to the determined avoidance behavior type based on surrounding environment information. For example, the vehicle 100 may change the avoidance trajectory according to the avoidance behavior type using position information of nearby vehicles and determine the changed avoidance trajectory as the final avoidance trajectory. According to an embodiment, the vehicle 100 may determine a maximum allowable distance for a lateral behavior of the vehicle based on nearby object information. The vehicle 100 may determine a final avoidance trajectory based on the maximum allowable distance for the lateral behavior of the vehicle.

As described above, a vehicle according to various embodiments of the present disclosure may determine the avoidance behavior type of the own vehicle based on the predicted trajectory of the behavior of the nearby object and the behavior trajectory of the own vehicle for each avoidance behavior type for avoiding collision within the lane, thereby minimizing the risk of collision with the nearby object. In addition, a vehicle according to various embodiments of the present disclosure may perform collision avoidance by additionally considering behavior information of nearby objects and road information (e.g., a lane, curvature of a road, existence of a shoulder, and the like), thereby becoming capable of responding flexibly to collision situations according to various surrounding environments.

What is claimed is:

1. A vehicle comprising:

a plurality of sensors configured to obtain surrounding environment information including nearby object information or road information; and a processor in operative connection with the plurality of sensors, the processor being configured to:

predict a position change of a nearby object based on the surrounding environment information;

determine one among a plurality of avoidance behavior types for avoiding collision in a lane as an avoidance behavior type of the vehicle based on the predicted position change of the nearby object, wherein the plurality of avoidance behavior types comprises an evasive steering to right (ESR) type, an evasive steering to left (ESL) type, or a decelerating (DEC) type;

control, based on the determined avoidance behavior type, lateral movement of the vehicle for collision avoidance without crossing outer edges of a current driving lane;

generate an image comprising a first predicted trajectory for a behavior of the nearby object based on the predicted position change of the nearby object; and generate images for each of the plurality of avoidance behavior types based on the generated image, wherein each of the images for each of the plurality of avoidance behavior types comprises a second predicted trajectory representing a relative behavior of the nearby object to the vehicle, wherein the second predicted trajectory is determined based on the first predicted trajectory and an avoidance trajectory of the vehicle according to a corresponding avoidance behavior type, and wherein, based on the second predicted trajectory comprised in the images for each of the plurality of avoidance behavior types, the processor is further configured to:

predict whether the collision avoidance is possible for each of the plurality of avoidance behavior types, and determine a first avoidance behavior type predicted to be capable of the collision avoidance among the plurality of avoidance behavior types as the avoidance behavior type of the vehicle.

2. The vehicle of claim 1, wherein the processor is further configured to:

predict whether the collision avoidance is possible for each of the plurality of avoidance behavior types using the first predicted trajectory for the behavior of the nearby object and an avoidance trajectory for each of the plurality of avoidance behavior types.

3. The vehicle of claim 1, wherein the processor is further configured to generate a final avoidance trajectory by changing an avoidance trajectory corresponding to the avoidance behavior type of the vehicle based on the surrounding environment information.

4. The vehicle of claim 3, wherein the processor is further configured to:

determine a maximum allowable distance for a lateral behavior of the vehicle, based on position information of the nearby object included in the nearby object information; and generate the final avoidance trajectory by changing the avoidance trajectory corresponding to the avoidance behavior type of the vehicle based on the maximum allowable distance for the lateral behavior.

5. The vehicle of claim 4, wherein, in response to there being another object in an avoidance direction corresponding to the avoidance behavior type of the vehicle, the processor is configured to limit the maximum allowable distance for the lateral behavior based on a position of the other object.

6. The vehicle of claim 4, wherein the processor is configured to generate the final avoidance trajectory by further considering the road information, and wherein the road information comprises one of or any combination of a curvature of a road on which the vehicle is traveling, a curvature change rate of the road on which the vehicle is traveling, and a slope of the road on which the vehicle is traveling.

7. The vehicle of claim 1, wherein the processor is further configured to:

calculate a degree of a risk of collision between the vehicle and the nearby object based on the nearby object information;

determine display brightness of the nearby object based on the calculated degree of risk of collision; and control the nearby object to be displayed according to the display brightness, when generating the image comprising the first predicted trajectory and the images for each of the plurality of avoidance behavior types.

8. The vehicle of claim 7, wherein the processor is further configured to:

calculate the degree of risk of collision based on a time to collision between the vehicle and the nearby object, and calculate a warning index for the nearby object, the warning index being calculated based on one of or any combination of a distance between the vehicle and the nearby object, a distance over which the vehicle travels before stopping when the vehicle moves with a uniform acceleration at a maximum deceleration, and a stopping distance considering a reaction time until a driver applies a brake.

9. A method for avoiding collision of a vehicle, the method comprising:

obtaining surrounding environment information comprising nearby object information or road information;

predicting a position change of a nearby object based on the surrounding environment information;

determining one among a plurality of avoidance behavior types for collision avoidance in a lane as an avoidance behavior type of the vehicle, based on the predicted position change of the nearby object, wherein the plurality of avoidance behavior types comprises an evasive steering to right (ESR) type, an evasive steering to left (ESL) type, or a decelerating (DEC) type;

controlling, based on the determined avoidance behavior type, lateral movement of the vehicle for the collision avoidance without crossing outer edges of a current driving lane, wherein determining the one among the plurality of avoidance behavior types for the collision avoidance in the lane comprises:

generating an image comprising a first predicted trajectory for a behavior of the nearby object based on the predicted position change of the nearby object; and generating images for each of the plurality of avoidance behavior types based on the generated image, wherein each of the images for each of the plurality of avoidance behavior types comprises a second predicted trajectory representing a relative behavior of the nearby object to the vehicle, and wherein the second predicted trajectory is determined based on the first predicted trajectory and an avoidance trajectory of the vehicle according to a corresponding avoidance behavior type; and based on the second predicted trajectory comprised in the images for each of the plurality of avoidance behavior types, predicting whether the collision avoidance is possible for each of the plurality of avoidance behavior types; and determining a first avoidance behavior type predicted to be capable of the collision avoidance among the plurality of avoidance behavior types as the avoidance behavior type of the vehicle.

10. The method of claim 9, wherein determining the one among the plurality of avoidance behavior types for the collision avoidance in the lane further comprises:

predicting whether the collision avoidance is possible for each of the plurality of avoidance behavior types using the first predicted trajectory for the behavior of the nearby object and an avoidance trajectory for each of the plurality of avoidance behavior types.

11. The method of claim 9, further comprising generating a final avoidance trajectory by changing an avoidance trajectory corresponding to the avoidance behavior type of the vehicle based on the surrounding environment information.

12. The method of claim 11, wherein generating the final avoidance trajectory comprises:

determining a maximum allowable distance for a lateral behavior of the vehicle based on position information of the nearby object included in the nearby object information; and generating the final avoidance trajectory by changing the avoidance trajectory corresponding to the avoidance behavior type of the vehicle based on the maximum allowable distance for the lateral behavior.

13. The method of claim 12, wherein, in response to another object being in an avoidance direction corresponding to the avoidance behavior type of the vehicle, the maximum allowable distance for the lateral behavior is limited based on a position of the other object.

14. The method of claim 12, wherein the final avoidance trajectory is formed by further considering the road information, and wherein the road information comprises a curvature of a road on which the vehicle is traveling, a curvature change rate of the road on which the vehicle is traveling, or a slope of the road on which the vehicle is traveling.

15. The method of claim 9, further comprising:

calculating a degree of risk of collision between the vehicle and the nearby object based on the nearby object information;

determining display brightness of the nearby object based on the calculated degree of risk of collision; and controlling the nearby object to be displayed according to the display brightness, when generating the image comprising the first predicted trajectory and images for each of the plurality of avoidance behavior types.

16. The method of claim 15, further comprising:

calculating the degree of risk of collision based on a time to collision between the vehicle and the nearby object; and calculating a warning index for the nearby object, the warning index being calculated based on a distance between the vehicle and the nearby object, a distance over which the vehicle travels before stopping when the vehicle moves with a uniform acceleration at a maximum deceleration, or a stopping distance considering a reaction time until a driver applies a brake.

17. A vehicle comprising:

a plurality of sensors configured to obtain surrounding environment information including nearby object information or road information; and a processor in operative connection with the plurality of sensors, the processor being configured to:

predict a position change of a nearby object based on the surrounding environment information;

determine one among a plurality of avoidance behavior types for avoiding collision in a lane as an avoidance behavior type of the vehicle based on the predicted position change of the nearby object, wherein the plurality of avoidance behavior types comprises an evasive steering to right (ESR) type, an evasive steering to left (ESL) type, or a decelerating (DEC) type;

control, based on the determined avoidance behavior type, lateral movement of the vehicle for collision avoidance without crossing outer edges of a current driving lane;

generate an image comprising a first predicted trajectory for a behavior of the nearby object based on the predicted position change of the nearby object; and generate images for each of the plurality of avoidance behavior types based on the generated image, wherein each of the images for each of the plurality of avoidance behavior types comprises a second predicted trajectory representing a relative behavior of the nearby object to the vehicle, wherein the second predicted trajectory is determined based on the first predicted trajectory and an avoidance trajectory of the vehicle according to a corresponding avoidance behavior type, and wherein the processor is further configured to:

calculate a degree of a risk of collision between the vehicle and the nearby object based on the nearby object information;

determine display brightness of the nearby object based on the calculated degree of risk of collision; and control the nearby object to be displayed according to the display brightness, when generating the image comprising the first predicted trajectory and the images for each of the plurality of avoidance behavior types.

18. The vehicle of claim 17, wherein the processor is further configured to:

calculate the degree of risk of collision based on a time to collision between the vehicle and the nearby object, and calculate a warning index for the nearby object, the warning index being calculated based on one of or any combination of a distance between the vehicle and the nearby object, a distance over which the vehicle travels before stopping when the vehicle moves with a uniform acceleration at a maximum deceleration, and a stopping distance considering a reaction time until a driver applies a brake.

19. The vehicle of claim 17, wherein the processor is further configured to:

generate the first predicted trajectory for the behavior of the nearby object based on the predicted position change of the nearby object;

predict whether the collision avoidance is possible for each of the plurality of avoidance behavior types using the first predicted trajectory for the behavior of the nearby object and an avoidance trajectory for each of the plurality of avoidance behavior types; and determine a first avoidance behavior type predicted to be capable of the collision avoidance among the plurality of avoidance behavior types as the avoidance behavior type of the vehicle.

20. The vehicle of claim 17, wherein the processor is further configured to generate a final avoidance trajectory by changing an avoidance trajectory corresponding to the avoidance behavior type of the vehicle based on the surrounding environment information.

* * * * *